US007847032B2

(12) United States Patent
Guo et al.

(10) Patent No.: US 7,847,032 B2
(45) Date of Patent: Dec. 7, 2010

(54) POLY(ARYLENE ETHER) COMPOSITION AND EXTRUDED ARTICLES DERIVED THEREFROM

(75) Inventors: Hua Guo, Selkirk, NY (US); Jian Guo, Shanghai (CN); Kazunari Kosaka, Mibu-Machi (JP); Xiucuo Li, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/331,802

(22) Filed: Dec. 10, 2008

(65) Prior Publication Data

US 2010/0139944 A1 Jun. 10, 2010

(51) Int. Cl.
C08G 65/02 (2006.01)
C08G 77/04 (2006.01)

(52) U.S. Cl. .............. 525/393; 524/133; 524/402; 524/403; 524/405; 524/436; 525/472; 528/25; 528/26; 528/29; 528/31; 528/32; 528/35

(58) Field of Classification Search ........... 524/133, 524/402, 403, 405, 436, 393; 525/472, 393, 525/396, 397, 474, 476; 528/25, 26, 29, 528/31, 32, 33, 35
See application file for complete search history.

(56) References Cited

U.S. PATENT DOCUMENTS

| 2,071,250 | A | 7/1931 | Carothers |
| 2,071,251 | A | 2/1937 | Carothers |
| 2,130,523 | A | 9/1938 | Carothers |
| 2,130,948 | A | 9/1938 | Carothers |
| 2,241,322 | A | 5/1941 | Hanford |
| 2,312,966 | A | 3/1943 | Hanford |
| 2,465,319 | A | 3/1949 | Whinfield |
| 2,512,606 | A | 6/1950 | Bolton et al. |
| 2,720,502 | A | 10/1955 | Caldwell |
| 2,727,881 | A | 12/1955 | Caldwell |
| 2,822,348 | A | 2/1958 | Haslam |
| 3,047,539 | A | 7/1962 | Pengilly |
| 3,379,792 | A | 4/1968 | Finholt |
| 3,671,487 | A | 6/1972 | Abolins |
| 3,953,394 | A | 4/1976 | Fox et al. |
| 4,128,526 | A | 12/1978 | Borman |
| 4,226,761 | A | 10/1980 | Cooper et al. |
| 4,664,972 | A | 5/1987 | Connolly |
| 4,769,424 | A | 9/1988 | Takekoshi et al. |
| 4,814,392 | A | 3/1989 | Shea et al. |
| 4,822,836 | A | 4/1989 | Wroczynski |
| 4,871,816 | A | 10/1989 | Percec et al. |
| 4,879,346 | A | 11/1989 | Bopp et al. |
| 4,970,272 | A | 11/1990 | Gallucci |
| 5,032,635 | A | 7/1991 | Avakian et al. |
| 5,061,746 | A | 10/1991 | Gallucci et al. |
| 5,110,896 | A | 5/1992 | Waggoner et al. |
| 5,132,365 | A | 7/1992 | Gallucci |
| 5,169,887 | A | 12/1992 | Snow et al. |
| 5,204,438 | A | 4/1993 | Snow et al. |
| 5,258,455 | A | 11/1993 | Laughner et al. |
| 5,281,686 | A | 1/1994 | Blohm et al. |
| 5,294,655 | A | 3/1994 | Lee, Jr. |
| 5,357,003 | A | 10/1994 | Smits et al. |
| 5,357,022 | A | 10/1994 | Banach et al. |
| 5,364,898 | A | 11/1994 | Lee, Jr. et al. |
| 5,385,984 | A | 1/1995 | Blohm et al. |
| 5,470,913 | A | 11/1995 | van der Meer et al. |
| 5,484,858 | A | 1/1996 | Smits et al. |
| 5,596,048 | A | 1/1997 | Blohm et al. |
| 5,625,011 | A | 4/1997 | Palsule |
| 5,693,700 | A | 12/1997 | Venkataramani et al. |
| 5,714,550 | A | 2/1998 | Shaw |
| 5,916,952 | A | 6/1999 | Romenesko et al. |
| 6,025,419 | A | 2/2000 | Kasowski et al. |
| 6,072,011 | A | 6/2000 | Hoover |
| 6,339,131 | B1 * | 1/2002 | Cella et al. .......... 525/474 |
| 6,593,411 | B2 | 7/2003 | Koevoets et al. |
| 7,329,708 | B2 | 2/2008 | Birsak et al. |
| 7,449,507 | B2 | 11/2008 | Fishburn |
| 7,534,822 | B2 | 5/2009 | Elkovitch et al. |
| 7,541,421 | B2 | 6/2009 | Carrillo et al. |
| 7,592,382 | B2 | 9/2009 | Borade et al. |

(Continued)

FOREIGN PATENT DOCUMENTS

CA 2052488 A1 4/1992

(Continued)

OTHER PUBLICATIONS

R.D. Allen and J.L. Hendrick, "Synthesis and properties of xylenyl ether-dimethylsioloxane triblock polymers", Polymer Bulletin, vol. 19, pp. 103-110 (1988).

(Continued)

Primary Examiner—Terressa M Boykin
(74) Attorney, Agent, or Firm—Cantor Colburn LLP

(57) ABSTRACT

A poly(arylene ether) composition includes a hydrogenated block copolymer of an alkenyl aromatic compound and a conjugated diene, a flame retardant, and a poly(arylene ether)-polysiloxane block copolymer reaction product that itself includes a poly(arylene ether)-polysiloxane block copolymer. The composition is useful for forming extruded articles, including insulation for wire and cable. The poly(arylene ether)-polysiloxane block copolymer contributes improved flame retardancy and, in many cases, improved physical properties to the composition.

27 Claims, No Drawings

U.S. PATENT DOCUMENTS

| | | | |
|---|---|---|---|
| 7,608,651 | B2 | 10/2009 | Borade et al. |
| 2004/0260036 | A1 | 12/2004 | Fishburn |
| 2005/0171323 | A1 | 8/2005 | Kamps et al. |
| 2005/0250885 | A1 | 11/2005 | Mercx et al. |
| 2005/0261417 | A1 | 11/2005 | Mezzenga et al. |
| 2006/0058432 | A1 | 3/2006 | Perego et al. |
| 2006/0106139 | A1 | 5/2006 | Kosaka et al. |
| 2006/0111484 | A1 | 5/2006 | Fishburn |
| 2006/0111548 | A1 | 5/2006 | Elkovitch et al. |
| 2006/0149000 | A1 | 7/2006 | Ikuta et al. |
| 2006/0167143 | A1 | 7/2006 | Borade et al. |
| 2006/0182967 | A1 | 8/2006 | Kosaka et al. |
| 2007/0112132 | A1 | 5/2007 | Zhao et al. |
| 2007/0208144 | A1 | 9/2007 | Delsman et al. |
| 2007/0208159 | A1 | 9/2007 | McCloskey et al. |
| 2007/0244231 | A1 | 10/2007 | Borade et al. |

FOREIGN PATENT DOCUMENTS

| | | |
|---|---|---|
| EP | 683209 A2 | 11/1995 |
| EP | 714951 A1 | 6/1996 |
| EP | 1253164 A1 | 10/2002 |
| GB | 1353501 A | 5/1974 |
| WO | 87/07281 A1 | 12/1987 |
| WO | 98/08898 A1 | 3/1998 |
| WO | 01/40353 A1 | 6/2001 |
| WO | 2007106296 A2 | 9/2007 |

OTHER PUBLICATIONS

Douglas A. Skoog et al., "Principles of Instrumental Analysis", 4th Edition, Saunders College Publishers, Harcourt Brace College Publishers, New York (1992), pp. 568-578.
JP 20038, Jul. 19, 1994, Translation.
JP 231769, Aug. 19, 2004, Translation.
JP 252214, Nov. 10, 1986, Translation.
JP57-195122, Nov. 30, 1982, Translation.
ASTM D2857-95, "Standard Practice for Dilute Solution Viscosity of Polymers", (Reapproved 2001), Downloaded Dec. 18, 2006, 6 pages.
ASTM D 2240-05, "Standard Test Method for Rubber Property—Durometer Hardness", Downloaded Feb. 26, 2007, 13 pages.
ASTM D1238-04c, "Standard Test Method for Melt Flow Rates of Thermoplastics by Extrusion Plastometer", Downloaded Jul. 25, 2007, 14 pages.
ASTM D790-03, "Standard Test Methods for Flexural Properties of Unreinforced and Reinforced Plastics and Electrical Insulating Materials", Downloaded May 25, 2004, 11 pages.
ASTM D638-03, "Standard Test Method for Tensile Properties of Plastics", Downloaded Jul. 25, 2007, 5 pages.
JP 2004231789, Published Aug. 19, 2004, Abstract, 1 page.
UL 94, Tests for Flammability of Plastic Materials for Parts in Devices and Appliances, Dec. 12, 2003, 52 pages.
UL 1581, Reference Standard for Electrical Wires, Cables, and Flexible Cords, May 6, 2003, 236 pages.
K.P. Chan et al., Facile Quantitative Analysis of Hydroxyl End Groups of Poly (2,6-dimethyl-1, 4-phenylene oxide)s by P NMR Spectroscopy, Macromolecules, 1994, vol. 27, pp. 6371-6375, Abstract, 1 page.
International Searching Authority, International Search Report and Written Opinion, PCT/US2009/045280, Date of Mailing: May 27, 2009, 8 pages.
JP200533369A; Dec. 2, 2005; Abstract Only (1 page).
International Search Report; International Application No. PCT/US2009/064110; International Filing Date Nov. 12, 2009 (8 pages).
Written Opinion of the International Searching Authority; International Application No. PCT/US2009/064110; International Filing Date Nov. 12, 2009 (5 pages).
Albemarle, Saytex HP-3010 Flame Retardant, Feb. 2008, 2 pages.
ASTM D3763-08, Standard Test Method for High Speed Puncture Properties of Plastic Using Load and Displacement Sensors, Downloaded Jul. 12, 2010, 9 pages.
ASTM D648-07, Standard Test Method for Deflection Temperature of Plastics Under Flexural Load in the Edgewise Position, Downloaded Jan. 12, 2009, 13 pages.
Clariant, Exolit OP 1312, Flame Retardants PHP, Edition Feb. 4, 2009, 2 pages.
Clariant, Exolit Overview, Nov. 2008 Edition, 8 pages.
JP 2002047409, Publication date: Feb. 12, 2002, Abstract, 1 page.
JP 2003105193, Publication date: Apr. 9, 2003, Abstract, 1 page.
JP 2005333698, Publication date: Dec. 2, 2005, Abstract, 1 page.
JP 3126744, Publication date: May 29, 1991,Abstract, 1 pages.
JP 4077552, Publication date: Mar. 11, 1992, Abstract, 1 page.
JP 61-252214, Publication date: Nov. 10, 1986, Abstract.
JP 6200015, Publication date: Jul. 19, 2004, Abstract, 1 page.
JP 63202652, Publication date: Aug. 22, 1988, Abstract, 1 page.
JP 9003322, Publication date: Jan. 7, 1997, Abstract, 1 page.
JP 9279044, Publication date: Mar. 11, 1992, Abstract, 1 page.
Pape et al., The Role of Silicone Powders in Reducing the Heat Release Rate and Evolution of Smoke in Flame Retardant Thermoplastics, Journal of Vinyl & Additive Technology, Sep. 1997, vol. 3, No. 3, 225-232.

\* cited by examiner

POLY(ARYLENE ETHER) COMPOSITION AND EXTRUDED ARTICLES DERIVED THEREFROM

BACKGROUND OF THE INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and insulation for wire and cable.

A different plastic, poly(vinyl chloride), is currently the commercially dominant material for flame retardant wire and cable insulation. However, poly(vinyl chloride) is a halogenated material. There is mounting concern over the environmental impact of halogenated materials, and non-halogenated alternatives are being sought. There is therefore a strong desire—and in some places a legislative mandate—to replace poly(vinyl chloride) with non-halogenated polymer compositions.

Recent research has demonstrated that certain halogen-free poly(arylene ether) compositions can possess the physical and flame retardant properties needed for use as wire and cable insulation. See, for example, U.S. Patent Application Publication Nos. US 2006/0106139 A1 and US 2006/0182967 A1 of Kosaka et al. The compositions disclosed in these references can exhibit good flame retardancy and good physical properties such as flexibility and tensile stress at break. Although the poly(arylene ether) component of these compositions is itself relatively flame retardant, substantial amounts of other flame retardants are typically added to assure that the compositions as a whole are sufficiently flame retardant. Trade-offs in physical properties typically accompany the relatively large amounts of flame retardants required. For example, when the flame retardant composition comprises substantial amounts of a metal hydroxide such as magnesium hydroxide, flexibility (as measured, for example, by the objective property tensile elongation) is compromised. As another example, when the flame retardant composition comprises substantial amounts of a liquid organic phosphate flame retardant, the flame retardant can migrate to the surface of the insulation, creating an esthetic problem and, more importantly, compromising the flame retardancy of the composition. There remains a desire for flame retardant poly (arylene ether) compositions that exhibit an improved balance of flame retardancy, physical properties, and esthetic properties.

BRIEF DESCRIPTION OF THE INVENTION

The above-described and other drawbacks are alleviated by a composition, comprising: 5 to 55 weight percent of a poly (arylene ether)-polysiloxane block copolymer reaction product comprising a poly(arylene ether) homopolymer, and a poly(arylene ether)-polysiloxane block copolymer comprising a poly(arylene ether) block, and a polysiloxane block comprising, on average, 35 to 80 siloxane repeating units; wherein the poly(arylene ether)-polysiloxane block copolymer reaction product comprises 1 to 8 weight percent siloxane repeating units and 92 to 99 weight percent arylene ether repeating units; wherein the poly(arylene ether)-polysiloxane block copolymer reaction product is the product of a process comprising oxidatively copolymerizing a monomer mixture comprising a monohydric phenol and a hydroxyaryl-terminated polysiloxane; and wherein the poly(arylene ether)-polysiloxane block copolymer reaction product has a weight average molecular weight of at least 30,000 atomic mass units; 10 to 55 weight percent of a hydrogenated block copolymer of an alkenyl aromatic compound and a conjugated diene; and 2 to 25 weight percent of a flame retardant; wherein all weight percents are based on the total weight of the composition.

Another embodiment is an extruded or injection molded article, comprising: the product of extrusion molding or injection molding a composition comprising 5 to 55 weight percent of a poly(arylene ether)-polysiloxane block copolymer reaction product comprising a poly(arylene ether) homopolymer, and a poly(arylene ether)-polysiloxane block copolymer comprising a poly(arylene ether) block, and a polysiloxane block comprising, on average, 35 to 80 siloxane repeating units; wherein the poly(arylene ether)-polysiloxane block copolymer reaction product comprises 1 to 8 weight percent siloxane repeating units and 92 to 99 weight percent arylene ether repeating units; wherein the poly(arylene ether)-polysiloxane block copolymer reaction product is the product of a process comprising oxidatively copolymerizing a monomer mixture comprising a monohydric phenol and a hydroxyaryl-terminated polysiloxane; and wherein the poly(arylene ether)-polysiloxane block copolymer reaction product has a weight average molecular weight of at least 30,000 atomic mass units; 10 to 50 weight percent of a hydrogenated block copolymer of an alkenyl aromatic compound and a conjugated diene; and 2 to 20 weight percent of a flame retardant; wherein all weight percents are based on the total weight of the composition.

These and other embodiments are described in detail below.

DETAILED DESCRIPTION OF THE INVENTION

The present inventors have determined that substitution of a particular poly(arylene ether)-polysiloxane block copolymer for some of the poly(arylene ether) homopolymer in a composition further comprising hydrogenated block copolymer and flame retardant improves the flame retardancy, and, in some cases, the physical properties of the composition. The improvement in flame retardancy can be utilized to reduce flame retardant levels, yielding further improvements in physical and esthetic properties. As demonstrated in the working examples below, these advantages are not obtained when an equivalent amount of polysiloxane is added to the composition. Thus, significant and unexpected advantages flow from the use of the poly(arylene ether)-polysiloxane block copolymer.

One embodiment is a composition, comprising: 5 to 55 weight percent of a poly(arylene ether)-polysiloxane block copolymer reaction product comprising a poly(arylene ether) homopolymer, and a poly(arylene ether)-polysiloxane block copolymer comprising a poly(arylene ether) block, and a polysiloxane block comprising, on average, 35 to 80 siloxane repeating units; wherein the poly(arylene ether)-polysiloxane block copolymer reaction product comprises 1 to 8 weight percent siloxane repeating units and 92 to 99 weight percent arylene ether repeating units; wherein the poly(arylene ether)-polysiloxane block copolymer reaction product is the product of a process comprising oxidatively copolymerizing a monomer mixture comprising a monohydric phenol and a hydroxyaryl-terminated polysiloxane; and wherein the poly (arylene ether)-polysiloxane block copolymer reaction product has a weight average molecular weight of at least 30,000 atomic mass units; 10 to 55 weight percent of a hydrogenated block copolymer of an alkenyl aromatic compound and a conjugated diene; and 2 to 25 weight percent of a flame retardant; wherein all weight percents are based on the total weight of the composition.

An important component of the present composition is a poly(arylene ether)-polysiloxane block copolymer. This component is synthesized by oxidative polymerization of a mixture of monohydric phenol and a hydroxyaryl-terminated polysiloxane. This oxidative polymerization produces poly(arylene ether)-polysiloxane block copolymer as the desired product and poly(arylene ether) (without an incorporated polysiloxane block) as a by-product. It is difficult and unnecessary to separate the poly(arylene ether) from the poly(arylene ether)-polysiloxane block copolymer. The poly(arylene ether)-polysiloxane block copolymer is therefore incorporated into the present composition as a "reaction product" that includes both the poly(arylene ether) and the poly(arylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(arylene ether)-polysiloxane block copolymer.

The poly(arylene ether)-polysiloxane block copolymer reaction product comprises a poly(arylene ether); and a poly(arylene ether)-polysiloxane block copolymer comprising a poly(arylene ether) block, and a polysiloxane block comprising, on average, 35 to 80 siloxane repeating units; wherein the poly(arylene ether)-polysiloxane block copolymer reaction product comprises 1 to 8 weight percent siloxane repeating units and 92 to 99 weight percent arylene ether repeating units; wherein the poly(arylene ether)-polysiloxane block copolymer reaction product is the product of a process comprising oxidatively copolymerizing a monomer mixture comprising a monohydric phenol and a hydroxyaryl-terminated polysiloxane; and wherein the poly(arylene ether)-polysiloxane block copolymer reaction product has a weight average molecular weight of at least 30,000 atomic mass units.

The poly(arylene ether)-polysiloxane block copolymer reaction product comprises a poly(arylene ether). The poly(arylene ether) is the product of polymerizing the monohydric phenol alone and is a by-product of the block copolymer synthesis. When the monohydric phenol consists of a single compound (for example, 2,6-dimethylphenol), the poly(arylene ether) is the product of homopolymerizing that single monohydric phenol. When the monohydric phenol comprises two or more distinct monohydric phenol species (for example, a mixture of 2,6-dimethylphenol and 2,3,6-trimethylphenol), the poly(arylene ether) is the product of copolymerizing the two or more distinct monohydric phenol species. Using the nuclear magnetic resonance methods described in the working examples, it has not been possible to allocate the phenylene ether residues between poly(arylene ether) and poly(arylene ether)-polysiloxane block copolymer. However, the presence of poly(arylene ether) is inferred from the detection and quantification of "tail" groups as defined below (e.g., 2,6-dimethylphenoxy groups when the monohydric phenol is 2,6-dimethylphenol) and/or the presence of "biphenyl" groups as defined below (e.g., the residue of 3,3',5,5'-tetramethyl-4,4'-biphenol) in the isolated product.

In addition to the poly(arylene ether), the poly(arylene ether)-polysiloxane block copolymer reaction product comprises a poly(arylene ether)-polysiloxane block copolymer. The poly(arylene ether)-polysiloxane block copolymer comprises a poly(arylene ether) block and a polysiloxane block. The poly(arylene ether) block is a residue of the polymerization of the monohydric phenol. In some embodiments, the poly(arylene ether) block comprises arylene ether repeating units having the structure

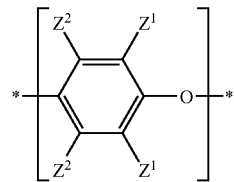

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it may, optionally, contain heteroatoms over and above the carbon and hydrogen members of the substituent residue. Thus, when specifically described as substituted, the hydrocarbyl residue may also comprise one or more substituents such as halogen (including fluorine, chlorine, bromine, and iodine), carboxylic acid groups, amino groups, hydroxyl groups, or the like, or it may contain divalent heteroatoms-containing groups such as oxygen atoms, silicon atoms, and carbonyl groups within the backbone of the hydrocarbyl residue. In some embodiments, the poly(arylene ether) block comprises 2,6-dimethyl-1,4-phenylene ether repeating units, that is, repeating units having the structure

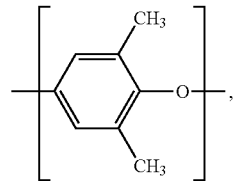

or 2,3,6-trimethyl-1,4-phenylene ether repeating units, or a combination thereof.

The polysiloxane block is a residue of the hydroxyaryl-terminated polysiloxane. In some embodiments, the polysiloxane block comprises repeating units having the structure

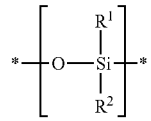

wherein each occurrence of $R^1$ and $R^2$ is independently hydrogen, $C_1$-$C_{12}$ hydrocarbyl or $C_1$-$C_{12}$ halohydrocarbyl; and the polysiloxane block further comprises a terminal unit having the structure

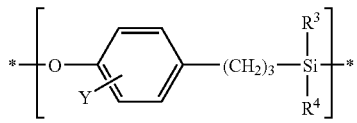

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl. In some embodiments, $R^1$ and $R^2$ are $C_1$-$C_6$ alkyl, specifically $C_1$-$C_3$ alkyl, more specifically methyl. In some embodiments, the polysiloxane repeating units comprise dimethylsiloxane (—Si(CH$_3$)$_2$O—) units. In some embodiments, the polysiloxane block has the structure

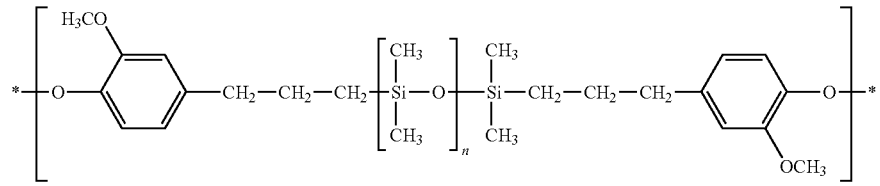

wherein n is 35 to 60.

In some embodiments, the poly(arylene ether) block comprises arylene ether repeating units having the structure

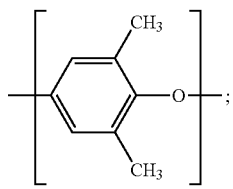

and the polysiloxane block has the structure

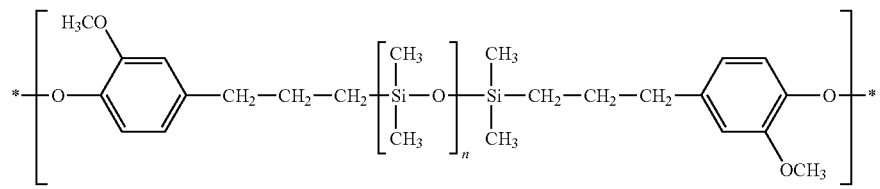

wherein n is 35 to 60; and the poly(arylene ether)-polysiloxane block copolymer reaction product has a number average molecular weight of 10,000 to 30,000 atomic mass units.

The hydroxyaryl-terminated polysiloxane comprises at least one hydroxyaryl terminal group. In some embodiments, the hydroxyaryl-terminated polysiloxane has a single hydroxyaryl terminal group, in which case a poly(arylene ether)-polysiloxane diblock copolymer is formed. In other embodiments, the hydroxyaryl-terminated polysiloxane has two hydroxyaryl terminal groups, in which case in which case poly(arylene ether)-polysiloxane diblock and/or triblock copolymers are formed. It is also possible for the hydroxyaryl-terminated polysiloxane to have a branched structure that allows three or more hydroxyaryl terminal groups and the formation of corresponding branched copolymers.

As noted above, the polysiloxane block comprises, on average, 35 to 80 siloxane repeating units. Within this range, the number of siloxane repeating units can be 35 to 60, more specifically 40 to 50. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxylaryl-terminate polysiloxane molecule can be determined by NMR methods that compare the intensity of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

The poly(arylene ether)-polysiloxane block copolymer reaction product comprises 1 to 8 weight percent siloxane repeating units and 92 to 99 weight percent arylene ether repeating units, based on the total weight of the poly(arylene ether)-polysiloxane block copolymer reaction product. Within these ranges, the weight percent of siloxane repeating units can be 3 to 7 weight percent, specifically 4 to 6 weight percent, more specifically 4 to 5 weight percent; and the weight percent arylene ether repeating units can be 93 to 97 weight percent, specifically 94 to 96 weight percent, more specifically 95 to 96 weight percent.

As mentioned above, the poly(arylene ether)-polysiloxane block copolymer reaction product is the product of a process comprising oxidatively copolymerizing a monomer mixture comprising a monohydric phenol and a hydroxyaryl-terminated polysiloxane. As such, the poly(arylene ether)-polysiloxane block copolymer reaction product is made by a process that is simpler than poly(arylene ether)-polysiloxane block copolymer synthesis methods that require the coupling of pre-formed poly(arylene ether) and polysiloxane blocks.

The poly(arylene ether)-polysiloxane block copolymer reaction product has a weight average molecular weight of at least 30,000 atomic mass units. In some embodiments the weight average molecular weight is 30,000 to 150,000 atomic mass units, specifically 35,000 to 120,000 atomic mass units, more specifically 40,000 to 90,000 atomic mass units, even more specifically 45,000 to 70,000 atomic mass units. In some embodiments, the poly(arylene ether)-polysiloxane block copolymer reaction product has a number average molecular weight of 10,000 to 50,000 atomic mass units, specifically 10,000 to 30,000 atomic mass units, more specifically 14,000 to 24,000 atomic mass units. A detailed chromatographic method for determining molecular weight is described in the working examples below.

The poly(arylene ether)-polysiloxane block copolymer reaction product can include relatively small amounts of very low molecular weight species. Thus, in some embodiments, the poly(arylene ether)-polysiloxane block copolymer reaction product comprises less than 25 weight percent of molecules having a molecular weight less than 10,000 atomic mass units, specifically 5 to 25 weight percent of molecules having a molecular weight less than 10,000 atomic mass units, more specifically 7 to 21 weight percent of molecules having a molecular weight less than 10,000 atomic mass units. In some embodiments, the molecules having a molecular weight less than 10,000 atomic mass units comprise, on average, 5 to 10 weight percent siloxane repeating units, specifically 6 to 9 weight percent siloxane repeating units.

Similarly, the poly(arylene ether)-polysiloxane block copolymer reaction product can also include relatively small amounts of very high molecular weight species. Thus, in some embodiments, the poly(arylene ether)-polysiloxane block copolymer reaction product comprises less than 25 weight percent of molecules having a molecular weight greater than 100,000 atomic mass units, specifically 5 to 25 weight percent of molecules having a molecular weight greater than 100,000 atomic mass units, more specifically 7 to 23 weight percent of molecules having a molecular weight greater than 100,000 atomic mass units. In some embodiments, the molecules having a molecular weight greater than 100,000 atomic mass units comprise, on average, 3 to 6 weight percent siloxane repeating units, specifically 4 to 5 weight percent siloxane repeating units.

In some embodiments, the poly(arylene ether)-polysiloxane block copolymer reaction product has an intrinsic viscosity of at least 0.3 deciliter per gram, as measured at 25° C. in chloroform. The intrinsic viscosity can be 0.3 to 0.6 deciliter pre gram, specifically 0.3 to 0.5 deciliter per gram, still more specifically 0.31 to 0.55 deciliter per gram, yet more specifically 0.35 to 0.47 deciliter per gram.

One indication of the efficiency with which the hydroxyaryl-terminated polysiloxane is incorporated into block copolymer is the low concentration of so-called poly (arylene ether) "tail" groups. In a homopolymerization of 2,6-dimethylphenol, a large fraction of product molecules have a so-called head-to-tail structure in which the linear product molecule is terminated on one end by a 3,5-dimethyl-4-hydroxyphenyl "head" and on the other end by a 2,6-dim-ethylphenoxy "tail". Thus, when the monohydric phenol consists of 2,6-dimethylphenol, the poly(arylene ether) tail group has the structure

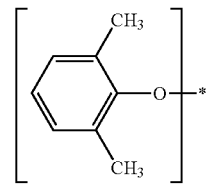

wherein the 3-, 4-, and 5-positions of the ring are substituted with hydrogen atoms (that is, the term 2,6-dimethylphenoxy does not encompass divalent 2,6-dimethyl-1,4-phenylene ether groups). In a copolymerization of monohydric phenol with hydroxyaryl-terminated polysiloxane, incorporation of the hydroxyaryl-terminated polysiloxane into block copolymer will reduce the concentration of arylene ether "tail" groups. When the monohydric phenol consists of 2,6-dimethylphenol, and particularly when the poly(arylene ether)-polysiloxane block copolymer reaction product is the sole source of polyphenylene ether in the composition, comprises less than or equal to 0.4 weight percent, specifically 0.2 to 0.4 weight percent, of 2,6-dimethylphenoxy groups, based on the weight of the composition. When the monohydric phenol consists of 2,6-dimethylphenol, and particularly when the composition comprises poly(arylene ether) in addition to that present in the poly(arylene ether)-polysiloxane block copolymer reaction product, the composition can comprise less than or equal to 1 weight percent, specifically 0.2 to 1 weight percent, of 2,6-dimethylphenoxy groups, based on the weight of the composition.

The poly(arylene ether)-polysiloxane block copolymer reaction product can further include groups derived from a diphenoquinone, which is itself an oxidation product of the monohydric phenol. For example, when the monohydric phenol is 2,6-dimethylphenol, the poly(arylene ether)-polysiloxane block copolymer reaction product can comprise 1.1 to 2.0 weight percent of 2,6-dimethyl-4-(3,5-dimethyl-4-hydroxyphenyl)phenoxy groups.

The poly(arylene ether)-polysiloxane block copolymer reaction product can be isolated from solution by an isolation procedure that minimizes volatile and nonvolatile contaminants. For example, in some embodiments, the poly(arylene ether)-polysiloxane block copolymer reaction product comprises less than or equal to 1 weight percent of total volatiles, specifically 0.2 to 1 weight percent of total volatiles, determined according to the procedure in the working examples below. In some embodiments, the monomer mixture is oxidatively copolymerized in the presence of a catalyst comprising a metal (such as copper or manganese), and the poly (arylene ether)-polysiloxane block copolymer reaction product comprises less than or equal to 100 parts per million by weight of the metal, specifically 0.5 to 100 parts per million by weight of the metal, more specifically 10 to 50 parts per million by weight of the metal, even more specifically 20 to 50 parts per million by weight of the metal.

The poly(arylene ether)-polysiloxane block copolymer reaction product can be prepared by a method comprising oxidatively copolymerizing the monohydric phenol and the hydroxyaryl-terminated polysiloxane to form a poly(arylene ether)-polysiloxane block copolymer reaction product. The oxidative copolymerization can be initiated in the presence of at least 50 weight percent of the hydroxyaryl-terminated polysiloxane and less than or equal to 50 weight percent of the monohydric phenol. In some embodiments, the oxidative copolymerization is initiated in the presence of at least 80 weight percent of the hydroxyaryl-terminated polysiloxane, specifically at least 90 weight percent of the hydroxyaryl-terminated polysiloxane, more specifically 100 weight percent of the hydroxyaryl-terminated polysiloxane.

The oxidative copolymerization can be conducted with a reaction time greater than or equal to 110 minutes.

The hydroxyaryl-terminated polysiloxane can comprise, on average, 35 to 80 siloxane repeating units. In some embodiments, the hydroxyaryl-terminated polysiloxane comprises, on average, 40 to 70 siloxane repeating units, specifically 40 to 60 siloxane repeating units, more specifically 40 to 50 siloxane repeating units. The hydroxyaryl-terminated polysiloxane can constitute 1 to 8 weight percent, specifically 3 to 8 weight percent, of the combined weight of the monohydric phenol and the hydroxyaryl-terminated polysiloxane.

The oxidative copolymerization can be conducted with a reaction time greater than or equal to 110 minutes. The reaction time is the elapsed time between initiation and termination of oxygen flow. (Although, for brevity, the description herein repeatedly refers to "oxygen" or "oxygen flow", it will be understood that any oxygen-containing gas, including air, can be used as the oxygen source.) In some embodiments, the reaction time is 110 to 300 minutes, specifically 140 to 250 minutes, more specifically 170 to 220 minutes.

The oxidative copolymerization can include a "build time" which is the time between completion of monomer addition and termination of oxygen flow. In some embodiments, the reaction time comprises a build time of 80 to 160 minutes. In some embodiments, the reaction temperature during at least part of the build time can be 40 to 60° C., specifically 45 to 55° C.

After termination of the copolymerization reaction, the product poly(arylene ether)-polysiloxane block copolymer reaction product can be isolated from solution using methods known in the art for isolating poly(arylene ether)s from solution. For example, the poly(arylene ether)-polysiloxane block copolymer reaction product can be isolated by precipitation with an antisolvent, such as a $C_1$-$C_6$ alkanol, including methanol, ethanol, n-propanol, and isopropanol. The present inventors have observed that the use of isopropanol is advantageous because it is a good solvent for unreacted hydroxyaryl-terminated polysiloxane. Therefore, precipitation and washing with isopropanol substantially removes hydroxyaryl-terminated polysiloxane from the isolated product. As an alternative to precipitation, the poly(arylene ether)-polysiloxane block copolymer reaction product can be isolated by direct isolation methods, including devolatilizing extrusion. In some embodiments, the composition comprises less than or equal to 1.5 weight percent of the hydroxyaryl-terminated polysiloxane, specifically less than or equal to 0.5 weight percent of the hydroxyaryl-terminated polysiloxane, based on the total weight of the composition. Precipitation of the poly(arylene ether)-polysiloxane block copolymer reaction product in isopropanol has been observed to be effective for separating hydroxyaryl-terminated polysiloxane from the reaction product.

In some embodiments, the poly(arylene ether)-polysiloxane block copolymer reaction product incorporates greater than 75 weight percent, of the hydroxyaryl-terminated polysiloxane starting material into the poly(arylene ether)-polysiloxane block copolymer. Specifically, the amount of hydroxyaryl-terminated polysiloxane incorporated into the poly(arylene ether)-polysiloxane block copolymer can be at least 80 weight percent, more specifically at least 85 weight percent, still more specifically at least 90 weight percent, yet more specifically at least 95 weight percent.

In a very specific procedure for preparing the poly(arylene ether)-polysiloxane block copolymer reaction product, the monohydric phenol is 2,6-dimethylphenol; the hydroxyaryl-terminated polysiloxane is a eugenol-capped polydimethylsiloxane comprising 35 to 60 dimethylsiloxane units; the oxidative copolymerization is initiated in the presence of at least 90 weight percent of the hydroxyaryl-terminated polysiloxane and 2 to 20 weight percent of the monohydric phenol; the oxidative copolymerization is conducted with a reaction time of 170 to 220 minutes; and the hydroxyaryl-terminated polysiloxane constitutes 2 to 7 weight percent of the combined weight of the monohydric phenol and the capped polysiloxane.

Additional details relating to the preparation, characterization, and properties of the poly(arylene ether)-polysiloxane block copolymer reaction product can be found in co-pending U.S. patent application Ser. No. 12/277,835, filed Nov. 25, 2008.

The composition comprises the poly(arylene ether)-polysiloxane block copolymer reaction product in an amount of 5 to 55 weight percent, specifically 25 to 50 weight percent, more specifically 30 to 45 weight percent, still more specifically 33 to 42 weight percent, all based on the total weight of the composition.

The composition can include poly(arylene ether) in addition to that derived from the poly(arylene ether)-polysiloxane block copolymer reaction product. For example, the composition can include this additional poly(arylene ether) in an amount of 1 to 35 weight percent, specifically 5 to 30 weight percent, more specifically 10 to 25 weight percent, based on the total weight of the composition. Since, in an analysis of the complete composition, it is difficult to distinguish between poly(arylene ether) derived from the poly(arylene ether)-polysiloxane block copolymer reaction product and poly(arylene ether) separately added to the composition, it can be useful to specify the "total poly(arylene ether), which consists of poly(arylene ether) molecules and the poly(arylene ether) blocks of the poly(arylene ether)-polysiloxane block copolymer reaction product. Thus, the composition can comprise total poly(arylene ether) in an amount of 20 to 55 weight percent, specifically 25 to 50 weight percent, more specifically 30 to 45 weight percent, still more specifically 33 to 42 weight percent, all based on the total weight of the composition.

In addition to the poly(arylene ether)-polysiloxane block copolymer reaction product, the composition comprises a hydrogenated block copolymer of an alkenyl aromatic compound and a conjugated diene. For brevity, this component is referred to herein as the "hydrogenated block copolymer". The hydrogenated block copolymer may comprise 10 to 90 weight percent of poly(alkenyl aromatic) content and 90 to 10 weight percent of hydrogenated poly(conjugated diene) content. In some embodiments, the poly(alkenyl aromatic) content is 10 to 45 weight percent, specifically 20 to 40 weight percent. In other embodiments, the poly(alkenyl aromatic) content is greater than 45 weight percent to 90 weight percent, specifically 45 to 80 weight percent. The hydrogenated block copolymer can have a weight average molecular weight of 40,000 to 400,000 atomic mass units. The number average molecular weight and the weight average molecular weight may be determined by gel permeation chromatography and based on comparison to polystyrene standards. In some embodiments, the hydrogenated block copolymer has a weight average molecular weight of 200,000 to 400,000 atomic mass units, specifically 220,000 to 350,000 atomic mass units. In other embodiments, the hydrogenated block copolymer can have a weight average molecular weight of 40,000 to less than 200,000 atomic mass units, specifically 40,000 to 180,000 atomic mass units, more specifically 40,000 to 150,000 atomic mass units.

The alkenyl aromatic monomer used to prepare the hydrogenated block copolymer can have the structure

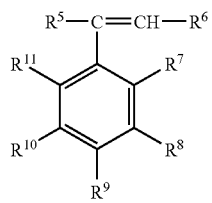

wherein $R^5$ and $R^6$ each independently represent a hydrogen atom, a $C_1$-$C_8$ alkyl group, or a $C_2$-$C_8$ alkenyl group; $R^7$ and $R^{11}$ each independently represent a hydrogen atom, a $C_1$-$C_8$ alkyl group, a chlorine atom, or a bromine atom; and $R^8$, $R^9$, and $R^{10}$ each independently represent a hydrogen atom, a $C_1$-$C_8$ alkyl group, or a $C_2$-$C_8$ alkenyl group, or $R^8$ and $R^9$ are taken together with the central aromatic ring to form a naphthyl group, or $R^9$ and $R^{10}$ are taken together with the central aromatic ring to form a naphthyl group. Specific alkenyl aromatic monomers include, for example, styrene, chlorostyrenes such as p-chlorostyrene, and methylstyrenes such as alpha-methylstyrene and p-methylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the hydrogenated block copolymer includes the residue of one or more acid functionalizing agents, such as maleic anhydride.

In some embodiments, the hydrogenated block copolymer comprises a polystyrene-poly(ethylene-butylene)-polystyrene triblock copolymer.

In some embodiments, the hydrogenated block copolymer comprises a polystyrene-poly(ethylene-butylene-styrene)-polystyrene triblock copolymer.

In some embodiments, the hydrogenated block copolymer comprises a polystyrene-poly(ethylene-butylene-styrene)-polystyrene triblock copolymer and a polystyrene-poly(ethylene-butylene)-polystyrene triblock copolymer.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Polymers as KRATON G1701 and G1702; the polystyrene-poly(ethylene-butylene)-polystyrene triblock copolymers available from Kraton Polymers as KRATON G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as KRATON RP-6935 and RP-6936, the polystyrene-poly(ethylene-propylene)-polystyrene triblock copolymers available from Kraton Polymers as KRATON G1730; the maleic anhydride-grafted polystyrene-poly(ethylene-butylene)-polystyrene triblock copolymers available from Kraton Polymers as KRATON G1901, G1924, and MD-6684; the maleic anhydride-grafted polystyrene-poly (ethylene-butylene-styrene)-polystyrene triblock copolymer available from Kraton Polymers as KRATON MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polystyrene block copolymer available from Asahi Kasei Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising 65 weight percent polystyrene available from Kuraray as SEPTON S2104. Mixtures of two of more hydrogenated block copolymers may be used.

The composition comprises the a hydrogenated block copolymer of an alkenyl aromatic compound and a conjugated diene in an amount of 10 to 55 weight percent, specifically 20 to 50 weight percent, more specifically 25 to 45 weight percent, even more specifically 35 to 40 weight percent, all based on the total weight of the composition.

In addition to the poly(arylene ether)-polysiloxane block copolymer reaction product and the hydrogenated block copolymer, the composition comprises a flame retardant. Suitable flame retardants include, for example, organophosphate esters, metal dialkyl phosphinates, nitrogen-containing flame retardants, metal hydroxides, metal borates, and mixtures thereof.

In addition to the poly(arylene ether) and the block copolymer, the thermoplastic composition comprises a flame retardant. Suitable flame retardants include, for example, triaryl phosphates (such as triphenyl phosphate, alkylated triphenyl phosphates, resorcinol bis(diphenyl phosphate), resorcinol bis(di-2,6-xylyl phosphate), and bisphenol A bis(diphenyl phosphate)), metal phosphinates (such as aluminum tris(diethyl phosphinate)), melamine salts (such as melamine cyanurate, melamine phosphate, melamine pyrophosphate, and melamine polyphosphate), metal borate salts (such as zinc borate), metal hydroxides (such as magnesium hydroxide and aluminum hydroxide), and combinations thereof.

The thermoplastic composition can comprise the flame retardant in an amount of 1 to 25 weight percent, specifically 5 to 20 weight percent, based on the total weight of the thermoplastic composition.

In some embodiments, the flame retardant comprises an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis-diphenylphosphate, as well as those based on bisphenols such as, for example, bisphenol A bis-diphenylphosphate. In some embodiments, the organophosphate ester is a triaryl phosphate selected from tris(alkylphenyl) phosphate (for example, CAS No. 89492-23-9 or CAS No. 78-33-1), resorcinol bis(diphenyl phosphate) (for example, CAS No. 57583-54-7), bisphenol A bis(diphenyl phosphate) (for example, CAS No. 181028-79-5), triphenyl phosphate (for example, CAS No. 115-86-6), tris(isopropylphenyl) phosphate (for example, CAS No. 68937-41-7), and mixtures of two or more of the foregoing organophosphate esters.

In some embodiments the organophosphate ester comprises a bis-aryl phosphate having the structure

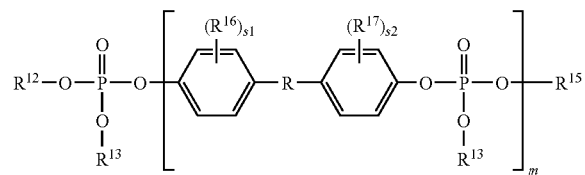

wherein R is independently at each occurrence a $C_1$-$C_{12}$ alkylidene group; $R^{16}$ and $R^{17}$ are independently at each occurrence a $C_1$-$C_5$ alkyl group; $R^{12}$, $R^{13}$, and $R^{15}$ are independently $C_1$-$C_{12}$ hydrocarbyl; $R^{14}$ is independently at each occurrence $C_1$-$C_{12}$ hydrocarbyl; m is an integer equal to 1 to 25; and s1 and s2 are independently at each occurrence an integer equal to 0, 1, or 2. In some embodiments $OR^5$, $OR^6$, $OR^7$, and $OR^8$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl)propane, bis(4-hydroxyphenyl)methane, bis(4-hydroxy-3,5-dimethylphenyl)methane, and 1,1-bis(4-hydroxyphenyl)ethane. In some embodiments, the bisphenol comprises bisphenol A.

In some embodiments, the flame retardant comprises a metal dialkyl phosphinate. As used herein, the term "metal dialkyl phosphinate" refers to a salt comprising at least one metal cation and at least one dialkyl phosphinate anion. In some embodiments, the metal dialkyl phosphinate has the formula

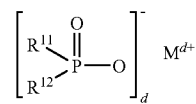

wherein $R^{11}$ and $R^{12}$ are each independently $C_1$-$C_6$ alkyl; M is calcium, magnesium, aluminum, or zinc; and d is 2 or 3. Examples of $R^{11}$ and $R^{12}$ include methyl, ethyl, n-propyl, isopropyl, n-butyl, tert-butyl, n-pentyl, n-hexyl, and cyclohexyl. In some embodiments, $R^1$ and $R^2$ are ethyl, M is aluminum, and d is 3 (that is, the metal dialkyl phosphinate is aluminum tris(diethyl phosphinate)).

In some embodiments, the metal dialkyl phosphinate is in particulate form. The metal dialkyl phosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkyl phosphinate may be combined with a polymer, such as a poly(arylene ether), a polyolefin, a polyamide, a block copolymer, or combination thereof, to form a masterbatch. The metal dialkyl phosphinate masterbatch comprises the metal dialkyl phosphinate in an amount greater than is present in the composition as a whole. Employing a masterbatch for the addition of the metal dialkyl phosphinate to the other components of the composition can facilitate addition and improve distribution of the metal dialkyl phosphinate.

In some embodiments, the flame retardant comprises a nitrogen-containing flame retardant comprising a nitrogen-containing heterocyclic base and the conjugate acid of a phosphate, pyrophosphate, polyphosphate, or cyanurate base. In some embodiments in which the conjugate acid is of a phosphate, pyrophosphate, or polyphosphate, the nitrogen-containing flame retardant has the formula

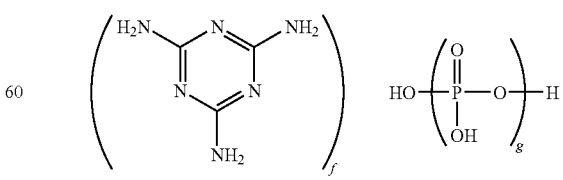

wherein g is 1 to about 10,000 and the ratio of f to g is about 0.5:1 to about 1.7:1, specifically 0.7:1 to 1.3:1, more specifically 0.9:1 to 1.1:1. It will be understood that this formula includes species in which one or more protons are transferred from the polyphosphate group to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to about 10,000, specifically about 5 to about 1,000, more specifically about 10 to about 500. In some embodiments in which the nitrogen-containing flame retardant is melamine polyphosphate, g has an average value of greater than 2 to about 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in International Patent Application No. WO 98/08898 A1 to Jacobson et al. In some embodiments, the nitrogen-containing flame retardant is melamine cyanurate (CAS Reg. No. 37640-57-6).

The nitrogen-containing flame retardant can have a low volatility relative to temperatures used to melt blend the composition. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

In some embodiments, the flame retardant comprises a metal hydroxide. Suitable metal hydroxides include all those capable of providing fire retardancy, as well as combinations thereof. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include magnesium hydroxide (for example, CAS No. 1309-42-8), aluminum hydroxide (for example, CAS No. 21645-51-2), cobalt hydroxide (for example, CAS No. 21041-93-0), and combinations thereof. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, i.e. a weight loss of less than 1 weight percent upon drying at 120° C. for 1 hour. In some embodiments the metal hydroxide can be coated, for example, with stearic acid or other fatty acid.

In some embodiments, the flame retardant comprises a metal borate. Suitable metal borates include zinc borate, barium metaborate, magnesium borate, calcium borate, potassium tetraborate, sodium borate, and combinations thereof.

In some embodiments, the flame retardant is selected from group consisting of metal dialkylphosphinates, triaryl phosphates, metal hydroxides, metal borates, melamine cyanurate, and mixtures thereof.

In some embodiments, the flame retardant comprises a metal dialkylphosphinate.

In some embodiments, the flame retardant comprises a triaryl phosphate.

In some embodiments, the flame retardant comprises a metal diallylphosphinate and a triaryl phosphate.

The composition comprises 2 to 25 weight percent of the flame retardant, based on the total weight of the composition. Within this range, the flame retardant amount can be 5 to 20 weight percent, specifically 8 to 16 weight percent. The specific amount of flame retardant can depend on factors including the flame retardant type, the total polyolefin content of the composition, and the intended use of the composition. When the flame retardant consists primarily of a metal dialkylphosphinate, such as aluminum tris(diethylphosphinate), the flame retardant amount can be 3 to 16 weight percent, specifically 5 to 12 weight percent, more specifically 6 to 9 weight percent. When the flame retardant consists primarily of triaryl phosphate, such as resorcinol bis(diphenyl phosphate) or bisphenol A bis(diphenyl phosphate), the flame retardant amount can be 5 to 18 weight percent, specifically 10 to 16 weight percent. When the flame retardant comprises a mixture of metal dialkylphosphinate and triaryl phosphate, the total flame retardant amount can be 5 to 18 weight percent, specifically 10 to 16 weight percent. When the flame retardant consists primarily of metal hydroxide, the total flame retardant amount can be 20 to 40 weight percent, specifically 25 to 35 weight percent. When the flame retardant consists primarily of metal borate, the total flame retardant amount can be 2 to 25 weight percent, specifically 10 to 15 weight percent.

In addition to the poly(arylene ether)-polysiloxane block copolymer reaction product, the hydrogenated block copolymer, and the flame retardant, the composition can, optionally, further comprise a polyolefin.

The term "polyolefin" when used without the modifier "total" (as in "total polyolefin") refers to olefin homopolymers and copolymers. That is, the polyolefin is the polymerization product of monomers consisting of aliphatically unsaturated aliphatic hydrocarbons. Thus, aromatic moieties are excluded from polyolefins, as are heteroatoms (that is, atoms other than carbon and hydrogen). Exemplary olefin homopolymers include polyethylene, high density polyethylene (HDPE), medium density polyethylene (MDPE), and isotactic polypropylene. Olefin copolymers include copolymers of ethylene and alpha-olefins like propene, 4-methyl-1-pentene, and 1-octene, as well as copolymers of ethylene and one or more poly(conjugated diene) rubbers and copolymers of propylene and one or more poly(conjugated diene) rubbers. Copolymers of ethylene and $C_3$-$C_{10}$ monoolefins and non-conjugated dienes, herein referred to as EPDM copolymers, are also included. Examples of $C_3$-$C_{10}$ monoolefins for EPDM copolymers include propene, 1-butene, 2-butene, 1-pentene, 2-pentene, 1-hexene, 2-hexene, 3-hexene, and the like. Dienes include 1,4-hexadiene and monocyclic and polycyclic dienes. Mole ratios of ethylene to $C_3$-$C_{10}$ monoolefin monomers can range from 95:5 to 5:95 with diene units being present in the amount of from 0.1 to 10 mole percent. Olefin copolymers further include linear low density polyethylene (LLDPE). The term "polyolefin" further include mineral oil.

When present, the polyolefin can be used in an amount of 1 to 50 weight percent, specifically 5 to 40 weight percent, more specifically 10 to 35 weight percent, all based on the total weight of the composition. In some embodiments, the composition comprises 3 to 15 weight percent of polybutene. In some embodiments, the composition comprises 3 to 15 weight percent of polypropylene.

When a high degree of flame retardancy is desired, it is helpful to limit the total polyolefin content of the composition. As used herein, the term "total polyolefin" includes polyolefins as defined above and further includes the polyolefin segments of block and graft copolymers. For example, total polyolefin includes the poly(ethylene-butylene) segment of a polystyrene-poly(ethylene-butylene)-polystyrene block copolymer, and the poly(ethylene-propylene) segment of a polystyrene-poly(ethylene-propylene) diblock copolymer. As another example, total polyolefin includes the poly(ethylene-octene) backbone of a poly(ethylene-octene)-graft-poly(maleic anhydride) graft copolymer. "Total polyolefin" includes only aliphatic content and therefore excludes poly(alkenyl aromatic) content. In some embodiments, the composition comprises less than or equal to 55 weight percent total polyolefin based on the total weight of the composition.

The composition can be specified not only in terms of the weight percents of the respective components, but also in terms of the weight ratio of components. Thus, in some embodiments, the weight ratio of total polyolefin to poly(arylene ether)-polysiloxane block copolymer reaction product is less than or equal to 1.5:1, specifically 0.3:1 to 1.5:1, more specifically 0.5:1 to 1.3:1, still more specifically 0.8:1 to 1.2:1, wherein total polyolefin consists of polyolefins, polyolefin blocks in block copolymers, and polyolefin backbones and grafts in graft copolymers.

The composition can also be specified in terms of the ratio of total polyolefin to the sum of poly(arylene ether)-polysiloxane block copolymer reaction product and flame retardant. Thus, in some embodiments, the weight ratio of total polyolefin to the sum of flame retardant and poly(arylene ether)-polysiloxane block copolymer reaction product is less than or equal to 1.2:1, specifically 0.5:1 to 1:1, more specifically 0.6:1 to 0.9:1, wherein total polyolefin consists of polyolefins, polyolefin blocks in block copolymers, and polyolefin backbones and grafts in graft copolymers.

The composition can also be specified in terms of the ratio of polyolefin to the sum of poly(arylene ether)-polysiloxane block copolymer reaction product and flame retardant. In this context, "polyolefin" consists of olefin homopolymers and copolymers. Thus, in some embodiments, the weight ratio of polyolefin to the sum of flame retardant and poly(arylene ether)-polysiloxane block copolymer reaction product is less than or equal to 1:1, specifically 0.1:1 to 1:1, more specifically 0.2:1 to 0.8:1, still more specifically 0.3:1 to 0.6:1.

The composition can, optionally, further comprise various additives known in the thermoplastics art. For example, the composition can, optionally, further comprise an additive chosen from stabilizers, antioxidants, mold release agents, processing aids, drip retardants, nucleating agents, UV blockers, dyes, pigments, fragrances, anti-static agents, metal deactivators, antiblocking agents, and the like, and combinations thereof. When present, additives are typically used in a total amount of about 0.5 to 10 weight percent, based on the total weight of the composition.

Components not taught herein as required or optional can, optionally, be excluded from the composition. For example, in some embodiments, the composition excludes any polymer other than the poly(arylene ether)-polysiloxane block copolymer reaction product, the hydrogenated block copolymer, and the optional polyolefin. In some embodiments, the poly(arylene ether) composition excludes one or more of polyamides, polyesters, homopolymers of alkenyl aromatic monomers (such as homopolystyrene), poly(phenylene sulfide)s, unhydrogenated block copolymers of an alkenyl aromatic and a conjugated diene, and rubber-modified polystyrenes.

In some embodiments, the composition excludes fillers. It will be understood that the exclusion of filler does not exclude small amounts (for example, less than 10 weight percent) of mineral pigments, such as titanium dioxide, when used to color the composition. In some embodiments, the poly(arylene ether) composition comprises no carbon black.

In a very specific embodiment, the composition comprises 25 to 42 weight percent of the poly(arylene ether)-polysiloxane block copolymer reaction product; the poly(arylene ether) block comprises arylene ether repeating units having the structure

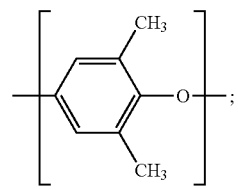

the polysiloxane block has the structure

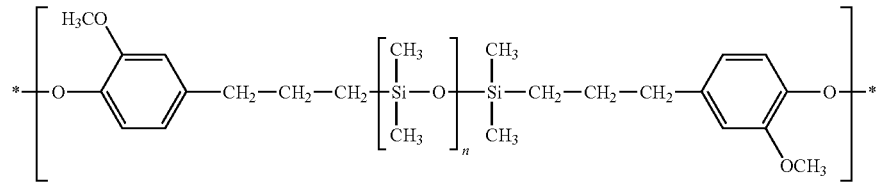

wherein n is 35 to 60; the poly(arylene ether)-polysiloxane block copolymer reaction product has a number average molecular weight of 10,000 to 30,000 atomic mass units; the composition comprises 20 to 45 weight percent of the hydrogenated block copolymer; the hydrogenated block copolymer comprises a polystyrene-poly(ethylene-butylene-styrene)-polystyrene triblock copolymer and a polystyrene-poly(ethylene-butylene)-polystyrene triblock copolymer; the composition comprises 6 to 16 weight percent of the flame retardant; the flame retardant comprises a triaryl phosphate; the composition comprises 25 to 45 weight percent total polyolefin, wherein total polyolefin consists of polyolefins, polyolefin blocks in block copolymers, and polyolefin backbones and grafts in graft copolymers; and a ratio of total polyolefin to the sum of flame retardant and poly(arylene ether)-polysiloxane block copolymer reaction product is 0.55:1 to 0.95:1.

The composition can be formed by melt kneading the poly(arylene ether)-polysiloxane block copolymer reaction product, the hydrogenated block copolymer, the flame retardant, and any optional components. Melt-kneading equipment is known in the art and includes single-screw and twin-screw type extruders and similar mixing devices that can apply shear to the components. Specific melt-kneading procedures are described in the working examples below.

The composition exhibits improved flame retardancy compared to a corresponding composition in which poly(arylene ether) is substituted for the poly(arylene ether)-polysiloxane block copolymer reaction product. For example, in some embodiments, the composition exhibits an average flame out time of less than or equal to 50 seconds, specifically less than or equal to 40 seconds, more specifically less than or equal to 30 seconds, in the UL 94 Vertical Burning test when performed at a sample thickness of 6.4 millimeters. As another example, in some embodiments, the composition exhibits an average flame out time of less than or equal to 20 seconds, specifically less than or equal to 15 seconds, in the UL 1581, Section 1080 (VW-1 Vertical Specimen) flammability test, using a single coated copper wire with an outer diameter of 2 millimeters, a core diameter of 0.6 millimeter, and a coating thickness of 0.7 millimeter.

The composition can also exhibit improvement in one or more physical properties compared to a corresponding composition in which poly(arylene ether) is substituted for the poly(arylene ether)-polysiloxane block copolymer reaction product. For example, in some embodiments, the composition exhibits a tensile elongation at break value of at least 100%, specifically at least 150%, as measured according to ASTM D638 at 23° C.

The invention extends to articles formed from the composition. Thus, one embodiment is an extruded or injection molded article comprising the product of extrusion molding or injection molding a composition comprising 5 to 55 weight percent of a poly(arylene ether)-polysiloxane block copolymer reaction product comprising a poly(arylene ether) homopolymer, and a poly(arylene ether)-polysiloxane block copolymer comprising a poly(arylene ether) block, and a polysiloxane block comprising, on average, 35 to 80 siloxane repeating units; wherein the poly(arylene ether)-polysiloxane block copolymer reaction product comprises 1 to 8 weight percent siloxane repeating units and 92 to 99 weight percent arylene ether repeating units; wherein the poly(arylene ether)-polysiloxane block copolymer reaction product is the product of a process comprising oxidatively copolymerizing a monomer mixture comprising a monohydric phenol and a hydroxyaryl-terminated polysiloxane; and wherein the poly(arylene ether)-polysiloxane block copolymer reaction product has a weight average molecular weight of at least 30,000 atomic mass units; 10 to 50 weight percent of a hydrogenated block copolymer of an alkenyl aromatic compound and a conjugated diene; and 2 to 20 weight percent of a flame retardant; wherein all weight percents are based on the total weight of the composition.

Other embodiments include coated wire comprising a conductor, and a covering disposed on the conductor; wherein the covering comprises the composition described above. For example, one embodiment is a covered conductor with a normal to large conductor cross-sectional area corresponding to AWG 5 to AWG 24. The thickness of the coating can be, for example, 0.25 to 8.0 millimeter. The coating comprises the composition as described herein. The conductor can be a single thread/strand or a bundle of several threads/strands. The conductor material can be metal (such as copper, aluminum, steel, copper alloy, aluminum alloy, copper coated aluminum, nickel and or tin coated copper) for electrical power transmission or for electronic signal transmission. The covered conductor comprises a conductor and a covering comprising the thermoplastic composition, wherein the covering is disposed over the conductor, wherein the conductor has a cross-section that meets as least one of following: (i) American Wire Gauge (AWG) of AWG 24 to AWG 5, (ii) a cross-section area of 0.20 to 16.8 millimeters (corresponding to AWG 24 to AWG 5 according to ASTM B256-02); (iii) a nominal diameter of 0.51 to 4.62 millimeter (corresponding to AWG 24 to AWG 5 according to UL 1581, 4th edition, Table 20.1). The covering of the covered conductor has a thickness of 0.25 to 8 millimeter.

Another embodiment is a small conductor with a thin coating. In this embodiment, the conduct has a cross-sectional area corresponding to AWG 26 to AWG 56. The thickness of the coating can be, for example, 0.010 to 0.85 millimeter. The coating comprises the composition described herein. The conductor can be a single thread/strand or a bundle of several threads/strands. The conductor material can be metal (such as copper, aluminum, steel, copper alloy, copper coated aluminum, nickel and or tin coated copper) for electrical power transmission or for electronic signal transmission. Another embodiment is an automotive wire harness assembly comprising the covered conductors and an end use product comprising the automotive wire harness assembly. In addition, the conductor material also can be glass or plastics in optical fiber application for single transmission. The conductor can have a cross-section that meets as least one of following: (i) American Wire Gauge (AWG) of AWG 56 to AWG 26, (ii) a cross-section area of 0.000122 to 0.128 millimeter$^2$ (corresponding to AWG 56 to AWG 26 according to ASTM B256-02); (iii) a nominal diameter from 0.0124 to 0.404 millimeter (corresponding to AWG 56 to AWG 26 according to UL 1581, 4th edition, Table 20.1). The covering of the covered conductor can have a thickness of 0.010 to 0.85 millimeter.

The invention includes at least the following embodiments.

Embodiment 1

A composition, comprising: 5 to 55 weight percent of a poly(arylene ether)-polysiloxane block copolymer reaction product comprising a poly(arylene ether) homopolymer, and a poly(arylene ether)-polysiloxane block copolymer comprising a poly(arylene ether) block, and a polysiloxane block comprising, on average, 35 to 80 siloxane repeating units; wherein the poly(arylene ether)-polysiloxane block copolymer reaction product comprises 1 to 8 weight percent siloxane repeating units and 92 to 99 weight percent arylene ether repeating units; wherein the poly(arylene ether)-polysiloxane block copolymer reaction product is the product of a process comprising oxidatively copolymerizing a monomer mixture comprising a monohydric phenol and a hydroxyaryl-terminated polysiloxane; and wherein the poly(arylene ether)-polysiloxane block copolymer reaction product has a weight average molecular weight of at least 30,000 atomic mass units; 10 to 55 weight percent of a hydrogenated block copolymer of an alkenyl aromatic compound and a conjugated diene; and 2 to 25 weight percent of a flame retardant; wherein all weight percents are based on the total weight of the composition.

Embodiment 2

The composition of embodiment 1, wherein the poly (arylene ether)-polysiloxane block copolymer reaction product has a weight average molecular weight of 30,000 to 150,000 atomic mass units.

Embodiment 3

The composition of embodiment 1 or 2, wherein the poly (arylene ether)-polysiloxane block copolymer reaction product has an intrinsic viscosity of 0.3 to 0.6 deciliter per gram as measured at 25° C. in chloroform.

Embodiment 4

The composition of any of embodiments 1-3, wherein the poly(arylene ether)-polysiloxane block copolymer reaction product comprises less than 25 weight percent of molecules having a molecular weight less than 10,000 atomic mass units.

Embodiment 5

The composition of embodiment 4, wherein the molecules having a molecular weight less than 10,000 atomic mass units comprise, on average, 5 to 10 weight percent siloxane repeating units.

Embodiment 6

The composition of any of embodiments 1-5, wherein the poly(arylene ether)-polysiloxane block copolymer reaction product comprises less than 25 weight percent of molecules having a molecular weight greater than 100,000 atomic mass units.

Embodiment 7

The composition of embodiment 6, wherein the molecules having a molecular weight greater than 100,000 atomic mass units comprise, on average, 3 to 6 weight percent siloxane repeating units.

Embodiment 8

The composition of any of embodiments 1-7, wherein the monohydric phenol consists of 2,6-dimethylphenol, and wherein the poly(arylene ether)-polysiloxane block copolymer reaction product comprises less than or equal to 0.4 weight percent of 2,6-dimethylphenoxy groups.

Embodiment 9

The composition of any of embodiments 1-8, wherein the monohydric phenol consists of 2,6-dimethylphenol, and wherein the poly(arylene ether)-polysiloxane block copolymer reaction product comprises less than or equal to 1 weight percent of 2,6-dimethylphenoxy groups.

Embodiment 10

The composition of any of embodiments 1-9, wherein the poly(arylene ether) block comprises arylene ether repeating units having the structure

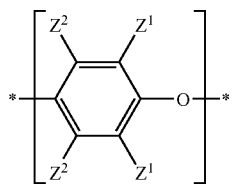

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom; wherein the polysiloxane block comprises repeating units having the structure

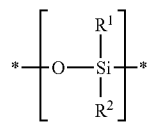

wherein each occurrence of $R^1$ and $R^2$ is independently hydrogen, $C_1$-$C_{12}$ hydrocarbyl or $C_1$-$C_{12}$ halohydrocarbyl; and wherein the polysiloxane block further comprises a terminal unit having the structure

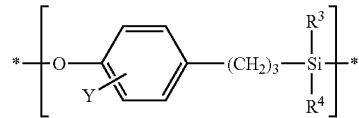

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl.

Embodiment 11

The composition of any of embodiments 1-10, wherein the poly(arylene ether) block comprises arylene ether repeating units having the structure

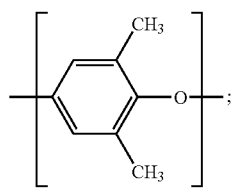

and wherein the polysiloxane block has the structure

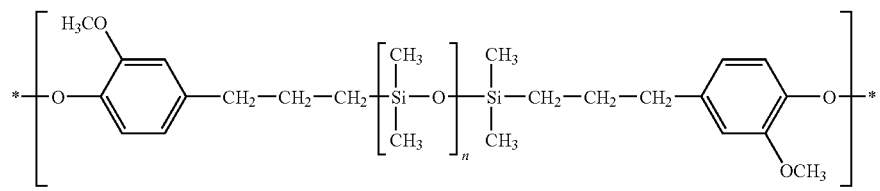

wherein n is 35 to 60; and wherein the poly(arylene ether)-polysiloxane block copolymer reaction product has a number average molecular weight of 10,000 to 30,000 atomic mass units.

Embodiment 12

The composition of any of embodiments 1-11, comprising less than or equal to 55 weight percent total polyolefin based on the total weight of the composition, wherein total polyolefin consists of polyolefins, polyolefin blocks in block copolymers, and polyolefin backbones and grafts in graft copolymers.

Embodiment 13

The composition of any of embodiments 1-12, wherein a weight ratio of total polyolefin to poly(arylene ether)-polysiloxane block copolymer reaction product is less than or equal to 1.5:1; wherein total polyolefin consists of polyolefins, polyolefin blocks in block copolymers, and polyolefin backbones and grafts in graft copolymers.

Embodiment 14

The composition of any of embodiments 1-13, wherein a weight ratio of total polyolefin to the sum of flame retardant and poly(arylene ether)-polysiloxane block copolymer reaction product is less than or equal to 1.2:1; wherein total polyolefin consists of polyolefins, polyolefin blocks in block copolymers, and polyolefin backbones and grafts in graft copolymers.

Embodiment 15

The composition of any of embodiments 1-14, wherein a weight ratio of polyolefin to the sum of flame retardant and poly(arylene ether)-polysiloxane block copolymer reaction product is less than or equal to 1:1; wherein polyolefin consists of olefin homopolymers and copolymers.

Embodiment 16

The composition of any of embodiments 1-15, wherein the hydrogenated block copolymer comprises a polystyrene-poly(ethylene-butylene-styrene)-polystyrene triblock copolymer.

Embodiment 17

The composition of any of embodiments 1-16, wherein the hydrogenated block copolymer comprises a polystyrene-poly(ethylene-butylene-styrene)-polystyrene triblock copolymer and a polystyrene-poly(ethylene-butylene)-polystyrene triblock copolymer.

Embodiment 18

The compositions of any embodiments 1-17, wherein the flame retardant is selected from group consisting of metal dialkylphosphinates, triaryl phosphates metal hydroxides, metal borates, melamine salts, and mixtures thereof.

Embodiment 19

The composition of any of embodiments 1-18, wherein the flame retardant comprises a metal dialkylphosphinate.

Embodiment 20

The composition of any of embodiments 1-19, wherein the flame retardant comprises a triaryl phosphate.

Embodiment 21

The composition of any of embodiments 1-20, wherein the flame retardant comprises a metal dialkylphosphinate and a triaryl phosphate.

Embodiment 22

The composition of any of embodiments 1-21, further comprising 1 to 50 weight percent of a polyolefin.

Embodiment 23

The composition of embodiment 1, wherein the composition comprises 25 to 42 weight percent of the poly(arylene ether)-polysiloxane block copolymer reaction product; wherein the poly(arylene ether) block comprises arylene ether repeating units having the structure

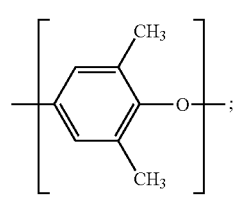

wherein the polysiloxane block has the structure

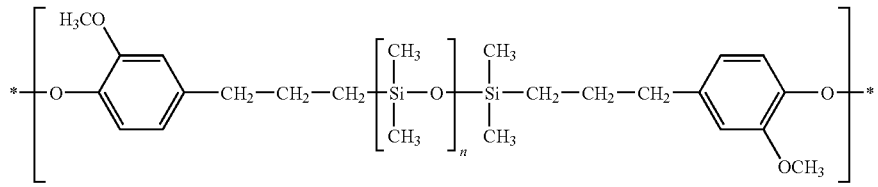

wherein n is 35 to 60; wherein the poly(arylene ether)-polysiloxane block copolymer reaction product has a number average molecular weight of 10,000 to 30,000 atomic mass units; wherein the composition comprises 20 to 45 weight percent of the hydrogenated block copolymer; wherein the hydrogenated block copolymer comprises a polystyrene-poly(ethylene-butylene-styrene)-polystyrene triblock copolymer and a polystyrene-poly(ethylene-butylene)-polystyrene triblock copolymer; wherein the composition comprises 6 to 16 weight percent of the flame retardant; wherein the flame retardant comprises a triaryl phosphate; wherein the composition comprises 25 to 45 weight percent total polyolefin; wherein total polyolefin consists of polyolefins, polyolefin blocks in block copolymers, and polyolefin backbones and grafts in graft copolymers; wherein a ratio of total polyolefin to the sum of flame retardant and poly(arylene ether)-polysiloxane block copolymer reaction product is 0.6:1 to 0.9:1.

Embodiment 24

The composition of embodiment 23, further comprising 3 to 15 weight percent of polybutene.

Embodiment 25

The composition of embodiment 23, further comprising 3 to 15 weight percent of polypropylene.

Embodiment 26

An extruded or injection molded article, comprising the product of extrusion molding or injection molding a composition comprising: 5 to 55 weight percent of a poly(arylene ether)-polysiloxane block copolymer reaction product comprising a poly(arylene ether) homopolymer, and a poly(arylene ether)-polysiloxane block copolymer comprising a poly(arylene ether) block, and a polysiloxane block comprising, on average, 35 to 80 siloxane repeating units; wherein the poly(arylene ether)-polysiloxane block copolymer reaction product comprises 1 to 8 weight percent siloxane repeating units and 92 to 99 weight percent arylene ether repeating units; wherein the poly(arylene ether)-polysiloxane block copolymer reaction product is the product of a process comprising oxidatively copolymerizing a monomer mixture comprising a monohydric phenol and a hydroxyaryl-terminated polysiloxane; and wherein the poly(arylene ether)-polysiloxane block copolymer reaction product has a weight average molecular weight of at least 30,000 atomic mass units; 10 to 50 weight percent of a hydrogenated block copolymer of an alkenyl aromatic compound and a conjugated diene; and 2 to 20 weight percent of a flame retardant; wherein all weight percents are based on the total weight of the composition.

Embodiment 27

The extruded article of embodiment 26, wherein the extruded or injection molded article is a coated wire comprising a conductor, and a covering disposed on the conductor; wherein the covering comprises the composition.

The invention is further illustrated by the following non-limiting examples.

PREPARATIVE EXAMPLES 1-6

These examples, which were conducted on a pilot plant scale, illustrate the effects of several process variables on the product characteristics of the reaction product.

The process variations are summarized in Table 1, where "Toluene source" refers to whether the toluene solvent is fresh ("Fresh" in Table 1) or recycled ("Recyc." in Table 1) from a poly(arylene ether) homopolymer synthesis; "DMBA level (%)" is the concentration of dimethyl-n-butylamine, expressed as a weight percent relative to the weight of toluene; "Solids (%)" is the weight of total 2,6-dimethylphenol and eugenol-capped polysiloxane, expressed as a weight percent relative to the sum of the weights of 2,6-dimethylphenol, eugenol-capped polysiloxane, and toluene; "Polysiloxane chain length" is the average number of dimethylsiloxane (—Si(CH$_3$)$_2$O—) units in the eugenol-capped polysiloxane; "Polysiloxane loading (%)" is the weight percent of eugenol-capped polysiloxane in the reaction mixture, based on the total weight of the eugenol-capped polysiloxane and the 2,6-dimethylphenol; "Initial 2,6-dimethylphenol (%)" is the weight percent of 2,6-dimethylphenol present in the reaction vessel at the initiation of polymerization (the introduction of oxygen to the reaction vessel), relative to the total weight of 2,6-dimethylphenol; "O:2,6-dimethylphenol mole ratio" is the mole ratio of atomic oxygen (provided as molecular oxygen) to 2,6-dimethylphenol maintained during the addition of 2,6-dimethylphenol; "Temp., initial charge (° C.)" is the temperature, in degrees centigrade, of the reaction mixture when the initial charge of monomer is added to the reaction vessel, and when oxygen is first introduced to the reaction mixture; "Temp., addition (° C.)" is the reaction temperature during further addition of 2,6-dimethylphenol; "Temp., build (° C.)" is the temperature, expressed in degrees centigrade, during the build phase of the reaction; "Ramp time (min)" is the time, expressed in minutes, during which the temperature was ramped from the addition temperature to the build temperature; "Ramp slope (° C./min)" is the rate of change of temperature, expressed in degrees centigrade per minute, during the period in which the temperature was ramped from the addition temperature to the build temperature; "Reaction time (min)" is the total reaction time, expressed in minutes, elapsed between the moment of oxygen introduction and the moment of oxygen cut-off. For all variations, controlled monomer addition time is 40 to 80 minutes from start of reaction (that is, the initiation of oxygen flow). Build time is measured from the end of controlled monomer addition to the end of reaction (that is, to the termination of oxygen flow); build time was varied between 80 and 160 minutes.

The process variations were superimposed on the following general synthetic procedure. The reactor and the 2,6-dimethylphenol addition tank were rinsed with warm toluene that was then discarded. The reaction was purged with nitrogen to achieve an oxygen concentration of less than 1%. The reactor was charged with initial toluene (fresh or recycled), and this toluene was stirred at 500 rotations per minute (rpm). The temperature of the initial toluene was adjusted to the "initial charge" temperature specified in Table 1 and maintained at that temperature during addition of the initial charge of 2,6-dimethylphenol from the addition tank to the reaction vessel. After the addition of the initial charge of 2,6-dimethylphenol was complete, the reaction vessel was charged with the eugenol-capped polydimethylsiloxane, the di-n-butylamine, the dimethyl-n-butylamine, the diamine, and the copper catalyst. Oxygen flow and further monomer addition were initiated, and the oxygen flow was regulated to maintain a head space concentration less than 17%. During further monomer addition, cooling water supply temperature was adjusted to maintain the temperature specified as "Temp., addition (° C.)" in Table 1. After monomer addition was complete, the monomer addition line was flushed with toluene and the reaction temperature was increased to the temperature specified as "Temp., build (° C.)" in Table 1. This temperature adjustment was conducted over the time period specified as "Ramp time (min)", and at the rate specified as "Ramp slope (° C./min)" in Table 1. The reaction was continued until a pre-determined time point was reached. The pre-determined end point is the time at which target intrinsic viscosity and maximum siloxane incorporation are attained and is typically 80 to 160 minutes after 2,6-dimethylphenyl addition ends. Once the time point was reached, the oxygen flow was stopped. The reaction mixture was then heated to 60° C. and pumped to a chelation tank containing aqueous chelant solution. The resulting mixture was stirred and held at 60° C. for one hour. The light (organic) and heavy (aqueous) phases were separated by decantation, and the heavy phase was discarded. A small portion of the light phase was sampled and precipitated with isopropanol for analysis, and the remainder of the light phase was pumped to a precipitation tank and combined with methanol antisolvent (for which isopropanol antisolvent can be substituted) in a weight ratio of 3 parts antisolvent to 1 part light phase. The precipitate was filtered to form a wet cake, which was reslurried three times with the same antisolvent and dried under nitrogen until a toluene concentration less than 1 weight percent was obtained.

Reaction conditions and properties of resulting products are summarized in Table 1. "Total volatiles (%)", which is weight percent of volatiles in the isolated product, was determined by measuring the percent weight loss accompanying drying for 1 hour at 110° C. under vacuum; "Residual Cu (ppm)", which is the residual catalyst concentration expressed as parts per million by weight of elemental copper, was determined by atomic absorption spectroscopy; for properties as a function of reaction time, samples were removed from the reactor and precipitated (without prior chelation of catalyst metal) by addition of one volume of reaction mixture to three volumes of room temperature isopropanol to yield a precipitate that was filtered, washed with isopropanol, and dried prior to $^1$H NMR (to determine weight percent siloxane and siloxane incorporation efficiency) and intrinsic viscosity analyses.

Number average molecular weight and weight average molecular weight were determined by gel permeation chromatography as follows. The gel permeation chromatograph is calibrated using eight polystyrene standards, each of narrow molecular weight distribution and collectively spanning a molecular weight range of 3,000 to 1,000,000 grams/mole. The columns used were 1e3 and 1e5 angstrom PLgel columns with a 5 microliter 100 angstrom PLgel guard column. Chromatography was conducted at 25° C. The elution liquid was chloroform with 100 parts per million by weight di-n-butylamine. The elution flow was 1.2 milliliters per minute. The detector wavelength was 254 nanometers. A third degree polynomial function is fitted through the calibration points. Experimental samples are prepared by dissolving 0.27 grams isolated block copolymer solid in 45 milliliters toluene. A 50 microliter sample of the resulting solution is injected into the chromatograph. The values of number average molecular weight ($M_n$) and weight average molecular weight ($M_w$) are calculated from the measured signal using the polystyrene calibration line. The values are subsequently converted from polystyrene molecular weight to poly(2,6-dimethyl-1,4-phenylene ether) molecular weights using the equation $M(PPE)=0.3122 \times M(PS)^{1.073}$, where M(PPE) is poly(2,6-dimethyl-1,4-phenylene ether) molecular weight and M(PS) is polystyrene molecular weight.

Reaction conditions and properties of resulting products are summarized in Table 1. For the product properties in Table 1, "Mol. Wt.<10K (%)" is the weight percent of the isolated reaction product having a molecular weight less than 10,000 atomic mass units, as determined by gel permeation chromatography; "Mol. Wt.>100K (%)" is the weight percent of the isolated reaction product having a molecular weight less than 10,000 atomic mass units, as determined by gel permeation chromatography; "IV, end of rxn. (dL/g)" is the intrinsic viscosity, expressed in deciliters per gram and measured by Ubbelohde viscometer at 25° C. in chloroform, of dried powder isolated by precipitation from isopropanol; "IV, end of cheln. (dL/g)" is the intrinsic viscosity, expressed in deciliters per gram and measured by Ubbelohde viscometer at 25° C. in chloroform, of the product present in the post-chelation organic phase which has been isolated by precipitation from isopropanol then dried; "$M_w$, end of rxn. (AMU)" is the weight average molecular weight, expressed in atomic mass units and measured by gel permeation chromatography, of the product present in the reaction mixture at the end of the polymerization reaction which has been isolated by precipitation from isopropanol then dried; "$M_n$, end of rxn. (AMU)" is the number average molecular weight, expressed in atomic mass units and measured by gel permeation chromatography, of the product present in the reaction mixture at the end of the polymerization reaction which has been isolated by precipitation from isopropanol then dried; "$M_w/M_n$, end of rxn." is the ratio of weight average molecular weight to number average molecular weight for the product present in the reaction mixture at the end of the polymerization reaction which has been isolated by precipitation from isopropanol then dried; "$M_w$, end of cheln. (AMU)" is the weight average molecular weight, expressed in atomic mass units and measured by gel permeation chromatography, of the product present in the post-chelation organic phase which has been isolated by precipitation from isopropanol then dried; "$M_n$, end of cheln. (AMU)" is the number average molecular weight, expressed in atomic mass units and measured by gel permeation chromatography, of the product present in the post-chelation organic phase which has been isolated by precipitation from isopropanol then dried; "$M_w/M_n$, end of cheln." is the ratio of weight average molecular weight to number average molecular weight for the product present in the post-chelation organic phase which has been isolated by precipitation from isopropanol then dried.

In Table 1, "Weight % siloxane (%)" is the weight percent of dimethylsiloxane units in the isolated product, based on the total weight of 2,6-dimethyl-1,4-phenylene ether units and dimethylsiloxane units in the isolated product, as determined by $^1$H NMR using protons labeled a and b in the structure labeled "Formula (I)", below, and calculated as $$\text{Weight \% Siloxane\_in\_product} = \frac{X}{X+Y} \times 100$$

where $$X = \frac{\text{Peak ``}b\text{'' Integral@ }0.6\ ppm \times Mn\ \text{Siloxane Fluid}}{\text{proton per Siloxane Chain}}, \text{ and}$$

$$Y = \frac{\text{Peak ``}a\text{'' Integral@ }6.47\ ppm \times MW\ \text{2,6}xylenol}{2}$$

where "Mn Siloxane Fluid" in the equation for X is the number average molecular weight of the dimethylsiloxane units in the hydroxyaryl-terminated polysiloxane, and "MW 2,6xylenol" in the equation for Y is the molecular weight of 2,6-dimethylphenol. Calling this metric "Weight % siloxane" is an oversimplification in that it neglects isolated product constituents other than the 2,6-dimethyl-1,4-phenylene ether units and dimethylsiloxane units. Nevertheless, it is a useful metric.

In Table 1, "Siloxane Incorporation Efficiency (%)" is the weight percent of dimethylsiloxane units in the isolated product compared to the weight percent of dimethylsiloxane units in the total monomer composition used in the reaction mixture (the precipitation from isopropanol removes unreacted (unincorporated) siloxane macromer), as determined by $^1$H NMR using protons labeled a and b in the structure labeled "Formula (I)", and calculated as $$\text{Siloxane\_Incorporation\_Efficiency\_(\%)} = \frac{\frac{\text{Weight \% Siloxane\_in\_product}}{\text{\% Siloxane Loaded}} \times 100$$

where the equation for Weight%Siloxane_in_product is given above, and $$\text{\% Siloxane Loaded} = \frac{\text{Weight of Siloxane Monomer Loaded}}{\text{Weight of Siloxane Monomer Loaded} + \text{Weight of 2,6 Monomer Loaded}} \times 100$$

where "Weight of Siloxane Monomer Loaded" is the weight of hydroxyaryl-terminated polysiloxane used in the reaction mixture, and "Weight of 2,6 Monomer Loaded" is the total weight of 2,6-dimethylphenol used in the reaction mixture. Calling this metric "Siloxane Incorporation Efficiency" is an oversimplification in that it neglects the possibility that small amounts of monomers and oligomers may be lost in the isolation process. For example, it is theoretically possible for the Siloxane Incorporation Efficiency to exceed 100% if all of the hydroxyaryl-terminated polysiloxane is incorporated into block copolymer, and some arylene ether oligomers are lost in the isolation procedure. Nevertheless, Siloxane Incorporation Efficiency is a useful metric.

In Table 1, "Tail (%)" refers to the percent of 2,6-dimethylphenol that are in an end group configuration compared to total 2,6-dimethylphenol residues and is determined by $^1$H NMR using the "tail" protons labeled e in the structure labeled "Formula (III)" below, and the protons labeled a in the structure labeled "Formula (I)" below, and calculated as $$\text{\% Tail} = \frac{Z}{Z+Y} \times 100$$

where the equation for Y is above, and $$Z = \frac{\text{Peak ``}e\text{'' Integral@ }7.09\ ppm \times MW\ \text{of 2,6}xylenol}{3}$$

In Table 2, "Biphenyl (%)" is the weight percent of 3,3',5,5'-tetramethyl-4,4'-biphenol residues, that is, residues having the structure

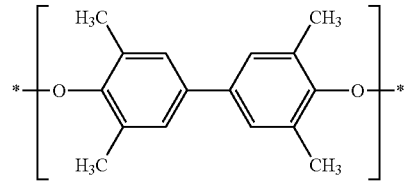

and is determined by $^1$H NMR using the "biphenyl" protons labeled d in the structure labeled "Formula (II)", below, and the protons labeled a in the structure labeled "Formula (I)", and calculated as $$\text{\% Biphenyl} = \frac{W}{W+Y} \times 100$$

where the equation for Y is above, and $$W = \frac{\text{Peak ``}d\text{'' Integral@ }7.35\ ppm \times MW\ \text{biphenyl}}{4}$$

wherein "MW biphenyl" is the molecular weight of the residue of 3,3',5,5'-tetramethyl-4,4'-biphenol shown above.

"OH (ppm)" is the parts per million by weight of all hydroxyl groups, based on the total weight of the isolated sample, as determined by $^{31}$P NMR after phosphorus derivatization of the hydroxyl groups of the isolated sample as described in K. P. Chan et al., "Facile Quantitative Analysis of Hydroxyl End Groups of Poly(2,6-dimethyl-1,4-phenylene oxide)s by $^{31}$P NMR Spectroscopy", *Macromolecules*, volume 27, pages 6371-6375 (1994).

Formula (I):

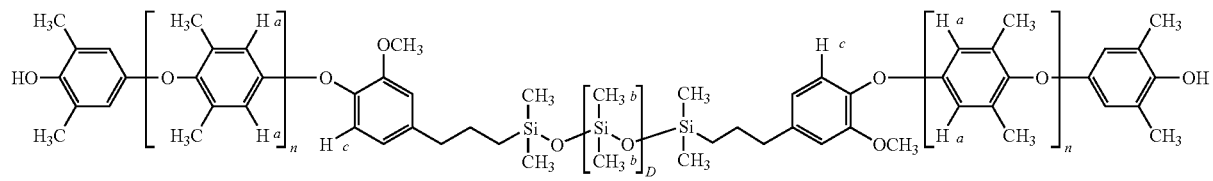

Formula (II):

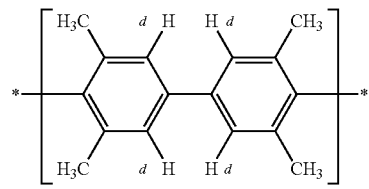

Formula (III):

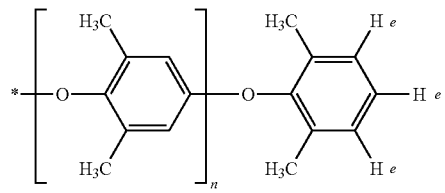

TABLE 1

|  | P. Ex. 1 | P. Ex. 2 | P. Ex. 3 | P. Ex. 4 |
|---|---|---|---|---|
| REACTION CONDITIONS | | | | |
| Toluene Source | Fresh | Fresh | Fresh | Recyc. |
| DMBA level (%) | 1 | 1 | 1.2 | 2.4 |
| Solids (%) | 23 | 23 | 23 | 23 |
| Polysiloxane chain length | 45 | 45 | 45 | 45 |
| Polysiloxane loading (%) | 5 | 5 | 5 | 5 |
| Initial 2,6-DMP (%) | 7.9 | 7.9 | 7.9 | 7.9 |
| O:2,6-DMP mole ratio | 0.98 | 0.98 | 0.98 | 0.98 |
| Catalyst (%) | 0.75 | 0.75 | 0.9 | 0.75 |
| Temp., initial charge (° C.) | 21 | 21 | 21 | 21 |
| Temp., addition (° C.) | 30 | 38 | 38 | 38 |
| Temp., build (° C.) | 49 | 49 | 49 | 49 |
| Ramp time (min) | 10 | 30 | 30 | 30 |
| Ramp slope (° C./min) | 1.9 | 0.37 | 0.37 | 0.37 |
| Reaction time (min) | 200 | 200 | 200 | 200 |
| FINAL PRODUCT PROPERTIES | | | | |
| Mol. Wt. <10K (%) | 12 | 7 | 10 | 12 |
| Mol. Wt. >100K (%) | 9 | 12 | 23 | 12 |
| IV, end of rxn. (dL/g) | 0.33 | 0.36 | 0.53 | 0.40 |
| IV, end of cheln. (dL/g) | 0.31 | 0.35 | 0.47 | 0.36 |
| $M_w$, end of rxn. (AMU) | 45000 | 51000 | 78000 | 58000 |
| $M_n$, end of rxn. (AMU) | 19000 | 20000 | 27000 | 24000 |
| $M_w/M_n$, end of rxn. | 2.4 | 2.6 | 2.9 | 2.4 |
| $M_w$, end of cheln. (AMU) | 45000 | 50000 | 70000 | 50000 |
| $M_n$, end of cheln. (AMU) | 18000 | 19000 | 22000 | 19000 |
| $M_w/M_n$, end of cheln. | 2.5 | 2.6 | 3.2 | 2.6 |
| Weight % siloxane (%) | 4.71 | 4.75 | 5.09 | 4.77 |
| Silox. Incorp. Effic. (%) | 94 | 95 | 102 | 95 |
| Weight % Biphenyl (%) | 1.3 | 1.25 | 1.1 | 1.26 |
| Total OH (ppm) | — | — | — | 1532 |
| Total volatiles (%) | 0.89 | 0.22 | — | — |
| Residual Cu (ppm) | 64 | 23 | — | — |
| PROPERTIES AS A FUNCTION OF REACTION TIME | | | | |
| Wt. % siloxane, 80 min (%) | 2.98 | 0.60 | 0.9 | 0.17 |
| Wt. % siloxane, 110 min (%) | 4.55 | 4.42 | 5.03 | 3.67 |
| Wt. % siloxane, 200 min (%) | 4.56 | 4.67 | 5.07 | 4.64 |
| Silox. Incorp. Effic., 80 min (%) | 59.66 | 12.00 | 18 | 3.34 |
| Silox. Incorp. Effic., 110 min (%) | 90.97 | 88.40 | 100.6 | 73.33 |
| Silox. Incorp. Effic., 200 min (%) | 91.21 | 93.40 | 101.4 | 92.81 |
| IV, 80 min (dL/g) | 0.11 | 0.06 | 0.08 | 0.06 |
| IV, 110 min (dL/g) | 0.29 | 0.29 | 0.39 | 0.12 |
| IV, 200 min (dL/g) | 0.33 | 0.36 | 0.53 | 0.40 |

|  | P. Ex. 5 | P. Ex. 6 | P. Ex. 7 |
|---|---|---|---|
| REACTION CONDITIONS | | | |
| Toluene Source | Recyc. | Recyc. | Recyc. |
| DMBA level (%) | 2.4 | 1.2 | 1.2 |
| Solids (%) | 23 | 23 | 23 |
| Polysiloxane chain length | 45 | 45 | 45 |
| Polysiloxane loading (%) | 5 | 5 | 5 |
| Initial 2,6-DMP (%) | 7.9 | 7.9 | 7.9 |
| O:2,6-dimethylphenol mole ratio | 0.98 | 0.98 | 0.98 |
| Catalyst (%) | 0.9 | 0.75 | 0.75 |
| Temp., initial charge (° C.) | 21 | 21 | 21 |
| Temp., addition (° C.) | 38 | 38 | 38 |
| Temp., build (° C.) | 49 | 49 | 49 |
| Ramp time (min) | 30 | 30 | 30 |
| Ramp slope (° C./min) | 0.37 | 0.37 | 0.37 |
| Reaction time (min) | 200 | 200 | 200 |
| FINAL PRODUCT PROPERTIES | | | |
| Mol. Wt. <10K (%) | 13 | 11 | 13 |
| Mol. Wt. >100K (%) | 19 | 16 | 19 |
| IV, end of rxn. (dL/g) | 0.53 | 0.45 | 0.53 |
| IV, end of cheln. (dL/g) | 0.46 | 0.39 | 0.46 |
| $M_w$, end of rxn. (AMU) | 72000 | 64000 | 72000 |
| $M_n$, end of rxn. (AMU) | 27000 | 23000 | 27000 |
| $M_w/M_n$, end of rxn. | 2.7 | 2.8 | 2.7 |
| $M_w$, end of cheln. (AMU) | 67000 | 56000 | 67000 |
| $M_n$, end of cheln. (AMU) | 23000 | 20000 | 23000 |
| $M_w/M_n$, end of cheln. | 2.9 | 2.7 | 2.9 |
| Weight % siloxane (%) | 4.9 | 4.78 | 4.9 |
| Silox. Incorp. Effic. (%) | 98 | 96 | 98 |
| Weight % Biphenyl (%) | 1.16 | 1.26 | 1.16 |
| Total OH (ppm) | — | — | — |
| Total volatiles (%) | — | — | — |
| Residual Cu (ppm) | — | — | — |
| PROPERTIES AS A FUNCTION OF REACTION TIME | | | |
| Wt. % siloxane, 80 min (%) | 3.39 | 1.68 | 3.39 |
| Wt. % siloxane, 110 min (%) | 4.88 | 4.71 | 4.88 |
| Wt. % siloxane, 200 min (%) | 4.88 | 4.93 | 4.88 |
| Silox. Incorp. Effic., 80 min (%) | 67.87 | 33.64 | 67.87 |
| Silox. Incorp. Effic., 110 min (%) | 97.67 | 94.26 | 97.67 |
| Silox. Incorp. Effic., 200 min (%) | 97.59 | 98.57 | 97.59 |

TABLE 1-continued

| | | | |
|---|---|---|---|
| IV, 80 min (dL/g) | 0.15 | 0.087 | 0.15 |
| IV, 110 min (dL/g) | 0.48 | 0.36 | 0.48 |
| IV, 200 min (dL/g) | 0.53 | 0.452 | 0.53 |

For characterization of the Example 4 composition as a function of molecular weight fraction, fractions from six gel permeation chromatography injections (36 mg of total material injected) were collected using a Gilson fraction collector. The effluent eluting between 12 and 25 minutes run time was divided into 60 test tubes which were later recombined to give 6 fractions with each contained approximately 16.67% of the total material (determined from area percent of the chromatogram). A small part (200 μl) of the five fractions was analyzed by gel permeation chromatography to confirm the success of the fractionation. The remaining part was used for $^1$H NMR analysis. The portion used for NMR analysis was evaporated to dryness at 50° C. under a nitrogen flow. One milliliter of deuterated chloroform (with tetramethylsilane as internal standard) was added and the samples were analyzed by $^1$H NMR. The results, presented in Table 4, show, first, that all fractions contain substantial dimethylsiloxane content. The fact that no "% tail" was detected in the highest molecular weight fraction indicates that this fraction is essentially free of poly(arylene ether) homopolymer; that is, it is essentially pure block copolymer. Similarly, the fact that the largest "% tail" was observed in the lowest molecular weight fraction means that the poly(arylene ether) is biased toward the lower molecular weight fractions.

TABLE 2

| Sample description | Siloxane weight (%) | Biphenyl weight (%) | Tail Weight (%) |
|---|---|---|---|
| Fraction 1 (83-100% of MW curve; highest MW fraction) | 4.39 | 0.56 | 0.00 |
| Fraction-02 (67-83% of MW curve) | 4.18 | 0.85 | 0.00 |
| Fraction-03 (50-67% of MW curve) | 4.34 | 0.87 | 0.00 |
| Fraction-04 (33-50% of MW curve) | 4.71 | 1.16 | 0.09 |
| Fraction-05 (17-33% of MW curve) | 5.27 | 1.61 | 0.19 |
| Fraction-06 (0-17% of MW curve; lowest Mw fraction) | 6.90 | 3.40 | 1.00 |

EXAMPLES 1-7, COMPARATIVE EXAMPLES 1-9

These examples illustrate the improved properties obtained by substituting a poly(arylene ether)-polysiloxane block copolymer reaction product for a poly(arylene ether) in a composition intended for use as wire and cable insulation. Specifically, these examples illustrate the use of a metal dialkylphosphinate flame retardant.

Sixteen compositions were prepared using the components listed in Table 3.

TABLE 3

| Material | Description |
|---|---|
| PPE-46 | Poly(2,6-dimethyl-1,4-phenylene ether), CAS Reg. No. 25134-01-4, having an intrinsic viscosity of 0.46 deciliter per gram measured in chloroform at 25° C.; obtained as PPO 646 from SABIC Innovative Plastics |
| PPE-40 | Poly(2,6-dimethyl-1,4-phenylene ether), CAS Reg. No. 25134-01-4, having an intrinsic viscosity of 0.40 deciliter per gram measured in chloroform at 25° C.; obtained as PPO 640 from SABIC Innovative Plastics |
| PPE-Si | Poly(2,6-dimethyl-1,4-phenylene ether)-co-poly(dimethylsiloxane) block copolymer, having an intrinsic viscosity of 0.46 deciliter per gram measured in chloroform at 25° C.; prepared as described for Preparative Example 17, above. |
| POE | Copolymer of ethylene and 1-octene, CAS Reg. No. 26221-73-8, having a melt flow rate of about 10 decigrams per minute measured according to ISO 1133 at 190° C. and a load of 2.16 kilograms; obtained as EXACT 8210 from ExxonMobil Chemical |
| PP | Polypropylene, CAS Reg. No. 9003-07-0, having a melt flow rate of 8 decigrams per minute measured according to ISO 1133 at 190° C. and a load of 2.16 kilograms; obtained as J-700GP from Prime Polymer Co., Ltd. |
| POE-g-MAH | Maleic anhydride grafted copolymer of ethylene and 1-octene, CAS Reg. No. 108-31-6; obtained as FUSABOND MN-493D from Du Pont Co., Ltd. |
| LLDPE | Ethylene-butene copolymer, CAS Reg. No. 9019-29-8; obtained as YUCLAIR JL210 from SK Corporation |
| TPE | Thermoplastic elastomers containing polystyrene-poly(ethylene/butylene)-polystyrene triblock copolymer (CAS Reg. No. 66070-58-4), polystyrene-poly(ethylene/propylene)-polystyrene triblock copolymer (CAS Reg. No. 68648-89-5), propylene homopolymer (CAS Reg. No. 9003-07-0), ethylene-propylene copolymer (CAS. Reg. No. 9010-79-1), mineral oil (CAS Reg. No. 72623-83-7), and calcium carbonate (CAS Reg. No. 471-34-1); obtained as Sumitomo TPE-SB 2400 from Sumitomo Chemical Co., Ltd. |
| SEBS I | Poly(styrene-ethylene/butylene-styrene) triblock copolymer, CAS Reg. No. 66070-58-4, having a polystyrene content of 40 weight percent, obtained as KRATON RP6936 from Kraton Polymers Ltd. |
| SEBS II | Poly(styrene-ethylene/butylene-styrene) triblock copolymer, CAS Reg. No. 66070-58-4, having a polystyrene content of 30%; obtained as KRATON G1650 from Kraton Polymers Ltd. |
| SEBS III | Poly(styrene-ethylene/butylene-styrene) triblock copolymer, CAS Reg. No. 66070-58-4, having a polystyrene content of 30%; obtained as KRATON G1651 from Kraton Polymers Ltd. |

TABLE 3-continued

| Material | Description |
|---|---|
| SEBS IV | Poly(styrene-ethylene/butylene-styrene) triblock copolymer, CAS Reg. No. 66070-58-4, having a polystyrene content of 13%; obtained as KRATON G1657 from Kraton Polymers Ltd. |
| SEBS V | Poly(styrene-ethylene/butylene-styrene) triblock copolymer, CAS Reg. No. 66070-58-4, having a polystyrene content of 62%; obtained as TUFTEC H1043 from Asahi Chemical |
| Polybutene | Polybutene, CAS Reg. No. 9003-29-6, having a number average molecular weight of 800 grams per mole, a polydispersity index of 1.60; obtained as INDOPOL H-50 from BP Chemical. |
| $Mg(OH)_2$ | Magnesium hydroxide, CAS Reg. No. 1309-42-8; obtained as KISUMA 5a from Kyowa Chemical |
| MC | Melamine cyanurate, CAS Reg. No. 37640-57-6; obtained as MELAPUR MC 25 from DSM Melapur |
| DEPAL | Aluminum tris(diethyl phosphinate), CAS Reg. No. 225789-38-8; obtained as EXOLIT OP1230 from Clariant |
| BPADP | Bisphenol A bis(diphenyl phosphate), CAS Reg. No. 181028-79-5; obtained as FYROLFLEX BDP from Supresta LLC, or REOFOS BAPP from Great Lakes Chemical Co. Ltd. |
| RDP | Resorcinol bis(diphenyl phosphate), CAS Reg. No. 57583-54-7; obtained as FYROLFLEX RDP from Supresta LLC. or REOFOS RDP from Great Lakes Chemical Co. Ltd. |
| ZB | Zinc borate hydrate, CAS Reg. No. 138265-88-0; obtained as FIREBRAKE ZB from U.S. Borax Inc. |
| CA | Citric acid monohydrate, CAS Reg. No. 77-92-9; obtained as Powder 76020249 from Jungbunzlauer |
| SIA | Aminoethylaminopropylpolysiloxane, CAS Reg. No. 67923-07-3; obtained as SF1706 from Momentive Performance Materials Co. Ltd. |
| CB | Carbon black (pigment); obtained as Channel Black from Heritage |
| Additives | Additives that can include one or more of the following: Erucamide (cis-13-docosenoamide), CAS Reg. No. 112-84-5, obtained as Erucamide from Mitsubishi; Octadecyl3(3,5ditertbutyl4hydroxyphenyl)propionate, CAS Reg. No. 2082-79-3 obtained as IRGANOX 1076 from CIBA; 2',3-bis[[3-[3,5-di-tert-butyl-4-hydroxyphenyl]]propionyl]]propionohydrazide, CAS Reg. No. 32687-78-8. obtained as IRGANOX MD1024 from CIBA; and the reaction product of 2,4-di(tert-butyl)phenol, phosphorus trichloride, and biphenyl, CAS Reg. No. 119345-01-6, obtained as SANDOSTAB P-EPQ from Clariant |

Specific compositions are detailed in Table 6, where component amounts are expressed in parts by weight except where expressly specified as weight percent, in which case the weight percent values are based on the total weight of the composition. In Table 6, "TOTAL (pbw)" is the total parts by weight of all components; "Total HBC (%)" is the calculated weight percent of hydrogenated block copolymer, based on the total weight of the composition (for example, for the compositions in Table 6, hydrogenated block copolymers include SEBS IV, SEBS II, SEBS I, and the SEBS and SEPS contents of the TPE component); "Total PO (%)" is the calculated weight percent of total polyolefin, based on the total weight of the composition (for example, for the compositions in Table 6, total polyolefin consists of POE, PP, mineral oil, and Polybutene, as well as the poly(ethylene-butylene) contents of all SEBS materials, the poly(ethylene-butylene) content of the SEBS in the TPE component, and the poly(ethylene-propylene) content of the SEPS in the TPE component; "(Total PO)/PPE" is the weight/weight ratio of total polyolefin to poly(arylene ether) (where, in this context, "poly(arylene ether)" includes poly(arylene ether) homopolymer, as well as the poly(arylene ether) block and the polysiloxane block content of the poly(arylene ether)-polysiloxane block copolymer); "(Total PO)/(PPE+FR)" is the weight/weight ratio of total polyolefin to the sum of poly(arylene ether) and flame retardant (for example, in Table 6, "flame retardant" consists of "DEPAL"; and again, "poly(arylene ether)" includes poly(arylene ether) homopolymer, as well as the poly(arylene ether) block and the polysiloxane block content of the poly(arylene ether)-polysiloxane block copolymer);

"PO/(PPE+FR) is the weight/weight ratio of "polyolefin" to the sum of poly(arylene ether) and flame retardant, where "polyolefin", as defined above, includes homopolymers and copolymers of monomers consisting of olefins (including mineral oil) and does not include the polyolefin content of block and graft copolymers derived in part from monomers other than olefins, and, again, "poly(arylene ether)" includes poly(arylene ether) homopolymer, as well as the poly(arylene ether) block and the polysiloxane block content of the poly(arylene ether)-polysiloxane block copolymer. The aminoethylaminopropylpolysiloxane listed in the tables below as "SIA" is included as a flame retardant, as is the citric acid monohydrate listed as "CA".

Compositions were compounded on a Toshiba Model TEM-37BS twin-screw extruder. Compounding conditions are summarized in Table 4.

TABLE 4

| Compounding Parameter | Unit | Value |
|---|---|---|
| Die | mm | 4–10 |
| Feed (Zone 0) Temp | ° C. | 20-50 |
| Zone 1 Temp | ° C. | 50-100 |
| Zone 2 Temp | ° C. | 140-220 |
| Zone 3 Temp | ° C. | 180-265 |
| Zone 4 Temp | ° C. | 205-285 |
| Zone 5 Temp | ° C. | 205-285 |
| Zone 6 Temp | ° C. | 205-285 |
| Zone 7 Temp | ° C. | 205-285 |
| Zone 8 Temp | ° C. | 205-285 |
| Zone 9 Temp | ° C. | 205-285 |

TABLE 4-continued

| Compounding Parameter | Unit | Value |
|---|---|---|
| Zone 10 Temp | °C. | 205-285 |
| Zone 11 Temp | °C. | 205-285 |
| Die Temp | °C. | 215-285 |
| Melt Temp | °C. | 215-285 |
| Screw speed | rpm | 300-500 |
| Throughput | kg/hr | 20-50 |
| Torque | % | 20-80 |
| Vacuum 1 | MPa | <0.08 |
| Side Feeder 1 speed | rpm | 200-300 |

The "material properties" in Table 6 were determined as follows. Test articles were injection molded using a barrel temperature of 250° C. and a mold temperature of 40-60° C. Values of melt flow rate, expressed in units of grams per 10 minutes and presented as "MFR, 250° C., 10 kg (g/10 min)" in Table 6, were measured according to ASTM D1238-04c at a temperature of 250° C. and a load of 10 kilograms. Values of flexural modulus, expressed in units of megapascals and presented as "Flexural Modulus (MPa)" in Table 6, were measured according to ASTM D790-07e1 at 23° C. Values of modulus of elasticity, expressed in units of megapascals and presented as "Modulus of Elasticity (MPa)" in Table 6, were measured according to ASTM D638-08 at 23° C.; the same standard procedure was used to determine tensile stress at break, expressed in units of megapascals and presented as "Tensile Stress (MPa)" in Table 6, and tensile elongation at break, expressed in units of percent and presented as "Tensile Elongation (%)" in Table 6. Values of Shore A Hardness, which are unitless and presented as "Shore A Hardness" in Table 6, were measured according to ASTM D2240-05 at 23° C. Flame out times, expressed in units of seconds and presented as "FOT UL94V, 3.2 mm (sec)" for sample thickness of 3.2 millimeters and as "FOT UL94V, 6.4 mm (sec)" for sample thickness of 6.4 millimeters, were determined using the UL 94 Vertical Burning Flame Test.

For material property values, pair-wise comparisons of comparative examples with poly(arylene ether) homopolymer to the corresponding inventive examples with poly(arylene ether)-polysiloxane block copolymer reaction product show improved tensile elongation and flame retardancy for the inventive examples. Specifically, with respect to tensile elongation, Comparative Example 1 exhibited a value of 127%, versus a value of 157% for Example 1; Comparative Example 3 exhibited a value of 109%, versus a value of 181% for Example 2; Comparative Example 5 exhibited a value of 134%, versus a value of 166% for Example 3; Comparative Example 6 exhibited a value of 123%, versus a value of 179% for Example 5; Comparative Example 8 exhibited a value of 165%, versus a value of 177% for Example 6; Comparative Example 9 exhibited a value of 176%, versus a value of 180% for Example 7. With respect to UL94 Vertical Burn flame out times determined at a sample thickness of 6.4 millimeters, Comparative Example 1 exhibited an average value of 97.4 seconds, versus an average value of 11.54 seconds for Example 1; Comparative Example 3 exhibited an average value of 11.42 seconds, versus an average value of 5.72 seconds for Example 2; Comparative Example 5 exhibited an average value of 14.4 seconds, versus an average value of 6.64 seconds for Example 3; Comparative Example 6 exhibited an average value of 23.3 seconds, versus an average value of 8.8 seconds for Example 5; and Comparative Example 9 exhibited an average value of 53.9 seconds, versus 33.6 seconds for Example 7. The only pair-wise comparison that did not show a flame retardancy advantage for the inventive sample was Comparative Example 8 exhibiting an average value of 12.8 seconds versus Example 6 exhibiting an average value of 16.1 seconds. In Table 6, in the FOT UL94V rows, "F" means failed to attain a V-0, V-1, or V-2 rating per the UL94 vertical burning test.

The "wire properties" in Table 6 were determined as follows. Test sample coated multi-strand copper wires having an outer diameter of 2 millimeters consisting of a 0.6 millimeter diameter copper wire core (that is, an American Wire Gauge (AWG) 24) strand of 11 copper wires, each wire having a 0.16 millimeter diameter), and a 0.7 millimeter insulation thickness, were prepared using the extrusion coating parameters shown in Table 5. The flame out times "VW-1, 2C/FOT (sec)" and "VW-1, 1C/FOT (sec)" were measured according to UL 1581, Section 1080 (VW-1 Vertical Specimen), with "2C" corresponding to two coated wires fixed together side by side, and "1C" corresponding to a single coated wire. Tensile stress at break, expressed in units of megapascals and presented as "Tensile Stress (MPa)" in Table 6, and tensile elongation at break, expressed in units of percent and presented as "Tensile Elongation (%)" in Table 6, were measured at 23° C. according to UL1581, Section 470. Heat deformation, expressed in units of percent and presented as "Heat Deformation, 121° C., 250 g, 1 h" in Table 6, was measured according to UL 1581, Section 560 ("Deformation") at 121° C. and 250 gram load.

For wire property values, pair-wise comparisons of comparative examples with poly(arylene ether) homopolymer to the corresponding inventive examples with poly(arylene ether)-polysiloxane block copolymer show improved flame retardancy and tensile elongation for several of the inventive samples (generally those with higher flame retardant levels). Specifically, with respect to VW-1 1C average flame out time values, Comparative Example 3 exhibited a value of 15.0 seconds, versus a value of 7.7 seconds for Example 2; Comparative Example 5 failed the test, versus a value of 12.7 seconds for Example 3; Comparative Example 6 failed the VW-1 2C test, while Example 5 exhibited a value of 21.7 seconds; and Comparative Example 8 failed the VW-1 1C test, versus a value of 10.0 seconds for Example 6. With respected to tensile elongation values, Comparative Example 1 exhibited a value of 233%, versus a value of 239% for Example 1; Comparative Example 3 exhibited a value of 182%, versus a value of 237% for Example 2; Comparative Example 5 exhibited a value of 205%, versus a value of 234% for Example 3; Comparative Example 6 exhibited a value of 184%, versus a value of 254% for Example 5; Comparative Example 8 exhibited a value of 218%, versus a value of 252% for Example 6; and Comparative Example 9 exhibited a value of 218%, versus a value of 232% for Example 7.

TABLE 5

| Wire Coating Extrusion Parameter | Typical Value | Units |
|---|---|---|
| Drying Temperature | 60-85 | °C. |
| Drying Time | 8-12 | hours |
| Maximum Moisture Content | 0.02 | % |
| Extruder Length/Diameter Ratio (L/D) | 22:1 to 26:1 | — |
| Screw compression Ratio | 1.2-3.5 | — |
| Screw speed | 15-85 | rpm |
| Feed Zone Temperature | 150-250 | °C. |
| Middle Zone Temperature | 220-270 | °C. |
| Head Zone Temperature | 220-280 | °C. |
| Neck Temperature | 220-280 | °C. |
| Cross-head Temperature | 220-280 | °C. |
| Die Temperature | 220-280 | °C. |
| Melt Temperature | 220-280 | °C. |
| Conductor Pre-heat Temperature | 25-150 | °C. |
| Screen Pack | 150-100 | μm |

TABLE 5-continued

| Wire Coating Extrusion Parameter | Typical Value | Units |
|---|---|---|
| Cooling Water Air Gap | 100-200 | μm |
| Water Bath Temperature | 15-80 | ° C. |

TABLE 6

|  | C. Ex. 1 | C. Ex. 2 | Ex. 1 |
|---|---|---|---|
| COMPOSITIONS |  |  |  |
| PPE-46 | 45 | 45 | 0 |
| PPE-Si | 0 | 0 | 45 |
| POE | 0 | 0 | 0 |
| PP | 0 | 0 | 0 |
| TPE | 11 | 11 | 11 |
| Polybutene | 6 | 6 | 6 |
| SEBS IV | 0 | 0 | 0 |
| SEBS II | 0 | 0 | 0 |
| SEBS I | 35 | 35 | 35 |
| DEPAL | 3 | 3 | 3 |
| Citric Acid | 0 | 0.25 | 0 |
| SIA | 0 | 1.75 | 0 |
| Additives | 1.5 | 1.5 | 1.5 |
| TOTAL (pbw) | 101.5 | 103.5 | 101.5 |
| Total HBC (%) | 38.3 | 37.5 | 38.3 |
| Total PO (%) | 36.3 | 35.6 | 36.3 |
| (Total PO)/PPE | 0.8 | 0.8 | 0.8 |
| (Total PO)/(PPE + FR) | 0.8 | 0.7 | 0.8 |
| PO (%) | 13.0 | 12.7 | 13.0 |
| PO/(PPE + FR) | 0.3 | 0.3 | 0.3 |
| MATERIAL PROPERTIES |  |  |  |
| MFR, 250° C., 10 kg (g/10 min) | 8.5 | 10.1 | 10.0 |
| Flexural Modulus (MPa) | 27.7 | 42.7 | 22.6 |
| Modulus of Elasticity (MPa) | 18.6 | 23.2 | 13.4 |
| Shore A Hardness | 84 | 83 | 82 |
| Tensile Stress (MPa) | 13.2 | 13.9 | 12.7 |
| Tensile Elongation (%) | 127 | 109 | 157 |
| FOT UL94V, 3.2 mm (sec) | — | — | — |
| FOT UL94V, 6.4 mm (sec) | 97.4/F | 70.3/F | 11.54/V1 |
| WIRE PROPERTIES |  |  |  |
| VW-1, 2C/FOT (sec) | F | F | F |
| VW-1, 1C/FOT (sec) | 19.3 | F | F |
| Tensile Stress (MPa) | 29.7 | 29.9 | 29.1 |
| Tensile Elongation (%) | 233 | 220 | 239 |
| Heat Deformation, 121° C., 250 g, 1 h | 4.4 | 3.9 | 4.6 |

|  | C. Ex. 3 | C. Ex. 4 | Ex. 2 |
|---|---|---|---|
| COMPOSITIONS |  |  |  |
| PPE-46 | 40 | 40 | 0 |
| PPE-Si | 0 | 0 | 40 |
| POE | 0 | 0 | 0 |
| PP | 0 | 0 | 0 |
| TPE | 14 | 14 | 14 |
| Polybutene | 6 | 6 | 6 |
| SEBS IV | 0 | 0 | 0 |
| SEBS II | 0 | 0 | 0 |
| SEBS I | 32 | 32 | 32 |
| DEPAL | 8 | 8 | 8 |
| Citric Acid | 0 | 0.25 | 0 |
| SIA | 0 | 1.75 | 0 |
| Additives | 1.5 | 1.5 | 1.5 |
| TOTAL (pbw) | 101.5 | 103.5 | 101.5 |
| Total HBC (%) | 36.4 | 35.7 | 36.4 |
| Total PO (%) | 37.2 | 36.5 | 37.2 |
| (Total PO)/PPE | 0.9 | 0.9 | 0.9 |
| (Total PO)/(PPE + FR) | 0.8 | 0.8 | 0.8 |
| PO (%) | 14.9 | 14.6 | 14.9 |
| PO/(PPE + FR) | 0.3 | 0.3 | 0.3 |

TABLE 6-continued

| MATERIAL PROPERTIES |  |  |  |
|---|---|---|---|
| MFR, 250° C., 10 kg (g/10 min) | 8.9 | 8.0 | 7.8 |
| Flexural Modulus (MPa) | 59.2 | 66.2 | 23.8 |
| Modulus of Elasticity (MPa) | 39.6 | 41.4 | 23.2 |
| Shore A Hardness | 85 | 84 | 80 |
| Tensile Stress (MPa) | 13.4 | 13.2 | 13.9 |
| Tensile Elongation (%) | 109 | 98 | 181 |
| FOT UL94V, 3.2 mm (sec) | 75.4 | 37.8 | 39.2 |
| FOT UL94V, 6.4 mm (sec) | 11.42/V-1 | 8.6/V-0 | 5.72/V-0 |
| WIRE PROPERTIES |  |  |  |
| VW-1, 2C/FOT (sec) | 31.0 | 27.3 | 28.0 |
| VW-1, 1C/FOT (sec) | 15.0 | 12.3 | 7.7 |
| Tensile Stress (MPa) | 25.1 | 23.9 | 24.7 |
| Tensile Elongation (%) | 182 | 166 | 237 |
| Heat Deformation, 121° C., 250 g, 1 h | 7.6 | 7.0 | 15.2 |

|  | C. Ex. 5 | Ex. 3 | Ex. 4 |
|---|---|---|---|
| COMPOSITIONS |  |  |  |
| PPE-46 | 40 | 0 | 0 |
| PPE-Si | 0 | 40 | 40 |
| POE | 0 | 0 | 0 |
| PP | 8 | 8 | 8 |
| TPE | 6 | 6 | 6 |
| Polybutene | 6 | 6 | 6 |
| SEBS IV | 0 | 0 | 0 |
| SEBS II | 0 | 0 | 0 |
| SEBS I | 32 | 32 | 32 |
| DEPAL | 8 | 8 | 8 |
| Citric Acid | 0 | 0 | 0.25 |
| SIA | 0 | 0 | 1.75 |
| Additives | 1.5 | 1.5 | 1.5 |
| TOTAL (pbw) | 101.5 | 101.5 | 103.5 |
| Total HBC (%) | 33.6 | 33.6 | 32.9 |
| Total PO (%) | 38.0 | 38.0 | 37.3 |
| (Total PO)/PPE | 1.0 | 1.0 | 1.0 |
| (Total PO)/(PPE + FR) | 0.8 | 0.8 | 0.8 |
| PO (%) | 17.6 | 17.6 | 17.3 |
| PO/(PPE + FR) | 0.4 | 0.4 | 0.3 |
| MATERIAL PROPERTIES |  |  |  |
| MFR, 250° C., 10 kg (g/10 min) | 11.7 | 14.4 | 14.2 |
| Flexural Modulus (MPa) | 91 | 65.8 | 56.8 |
| Modulus of Elasticity (MPa) | 51.2 | 44 | 44 |
| Shore A Hardness | 90 | 89 | 88 |
| Tensile Stress (MPa) | 17.7 | 16.1 | 16.6 |
| Tensile Elongation (%) | 134 | 166 | 160 |
| FOT UL94V, 3.2 mm (sec) | 71.9 | 42.6 | 59.1 |
| FOT UL94V, 6.4 mm (sec) | 14.4/V-1 | 6.64/V-0 | 7.8/V-0 |
| WIRE PROPERTIES |  |  |  |
| VW-1, 2C/FOT (sec) | 38.0 | 32.0 | 33.0 |
| VW-1, 1C/FOT (sec) | F | 12.7 | 13.0 |
| Tensile Stress (MPa) | 32.0 | 29.1 | 27.7 |
| Tensile Elongation (%) | 205 | 234 | 212 |
| Heat Deformation, 121° C., 250 g, 1 h | 4.9 | 5.9 | 6.4 |

|  | C. Ex. 6 | C. Ex. 7 | Ex. 5 |
|---|---|---|---|
| COMPOSITIONS |  |  |  |
| PPE-46 | 40 | 40 | 0 |
| PPE-Si | 0 | 0 | 40 |
| POE | 0 | 0 | 0 |
| PP | 0 | 0 | 0 |
| TPE | 14 | 14 | 14 |
| Polybutene | 6 | 6 | 6 |
| SEBS IV | 0 | 0 | 0 |
| SEBS II | 0 | 0 | 0 |
| SEBS I | 35 | 35 | 35 |
| DEPAL | 5 | 5 | 5 |
| Citric Acid | 0 | 0.25 | 0 |
| SIA | 0 | 1.75 | 0 |
| Additives | 1.5 | 1.5 | 1.5 |
| TOTAL (pbw) | 101.5 | 103.5 | 101.5 |
| Total HBC (%) | 39.3 | 38.6 | 39.3 |

TABLE 6-continued

| | | | |
|---|---|---|---|
| Total PO (%) | 38.9 | 38.2 | 38.9 |
| (Total PO)/PPE | 1.0 | 1.0 | 1.0 |
| (Total PO)/(PPE + FR) | 0.9 | 0.8 | 0.9 |
| PO (%) | 14.9 | 14.6 | 14.9 |
| PO/(PPE + FR) | 0.3 | 0.3 | 0.3 |
| MATERIAL PROPERTIES | | | |
| MFR, 250° C., 10 kg (g/10 min) | 9.2 | 8.4 | 9.9 |
| Flexural Modulus (MPa) | 60.4 | 62.3 | 20 |
| Modulus of Elasticity (MPa) | 37.2 | 38 | 18 |
| Shore A Hardness | 83 | 83 | 77 |
| Tensile Stress (MPa) | 14.9 | 13.2 | 12.4 |
| Tensile Elongation (%) | 123 | 103 | 179 |
| FOT UL94V, 3.2 mm (sec) | 104.2 | 61.3 | 59.5 |
| FOT UL94V, 6.4 mm (sec) | 23.34/V-1 | 16.1/V-1 | 8.82/V-0 |
| WIRE PROPERTIES | | | |
| VW-1, 2C/FOT (sec) | F | 30.3 | 21.7 |
| VW-1, 1C/FOT (sec) | 20.7 | 12.7 | 31.7 |
| Tensile Stress (MPa) | 24.9 | 24.3 | 26.0 |
| Tensile Elongation (%) | 184 | 171 | 254 |
| Heat Deformation, 121° C., 250 g, 1 h | 9.5 | 8.1 | 17.8 |

| | C. Ex. 8 | Ex. 6 | C. Ex. 9 | Ex. 7 |
|---|---|---|---|---|
| COMPOSITIONS | | | | |
| PPE-46 | 30 | 0 | 30 | 0 |
| PPE-Si | 0 | 30 | 0 | 30 |
| POE | 18 | 18 | 22 | 22 |
| PP | 15 | 15 | 15 | 15 |
| TPE | 0 | 0 | 0 | 0 |
| Polybutene | 6 | 6 | 6 | 6 |
| SEBS IV | 7 | 7 | 0 | 0 |
| SEBS II | 8 | 8 | 0 | 0 |
| SEBS I | 0 | 0 | 15 | 15 |
| DEPAL | 16 | 16 | 12 | 12 |
| Citric Acid | 0 | 0 | 0 | 0 |
| SIA | 0 | 0 | 0 | 0 |
| Additives | 1.6 | 1.6 | 1.6 | 1.6 |
| TOTAL (pbw) | 101.6 | 101.6 | 101.6 | 101.6 |
| Total HBC (%) | 14.8 | 14.8 | 14.8 | 14.8 |
| Total PO (%) | 49.9 | 49.9 | 51.2 | 51.2 |
| (Total PO)/PPE | 1.7 | 1.7 | 1.7 | 1.7 |
| (Total PO)/(PPE + FR) | 1.1 | 1.1 | 1.2 | 1.2 |
| PO (%) | 38.4 | 38.4 | 42.3 | 42.3 |
| PO/(PPE + FR) | 0.8 | 0.8 | 1.0 | 1.0 |
| MATERIAL PROPERTIES | | | | |
| MFR, 250° C., 10 kg (g/10 min) | 12.3 | 12.7 | 11.4 | 12.0 |
| Flexural Modulus (MPa) | 117 | 106 | 122 | 96.6 |
| Modulus of Elasticity (MPa) | 83.4 | 77.8 | 77.4 | 63.8 |
| Shore A Hardness | 93 | 93 | 93 | 92 |
| Tensile Stress (MPa) | 8.3 | 7.2 | 11.2 | 8.8 |
| Tensile Elongation (%) | 165 | 177 | 176 | 180 |
| FOT UL94V, 3.2 mm (sec) | 91.3/F | 25.3/V-1 | 52.4/F | 41.2/F |
| FOT UL94V, 6.4 mm (sec) | 12.8/V-1 | 16.1/V-1 | 53.9/F | 33.6/F |
| WIRE PROPERTIES | | | | |
| VW-1, 2C/FOT (sec) | 31.0 | 27.3 | 35.3 | 44.7 |
| VW-1, 1C/FOT (sec) | F | 10.0 | F | F |
| Tensile Stress (MPa) | 13.9 | 12.1 | 18.0 | 14.6 |
| Tensile Elongation (%) | 218 | 252 | 218 | 232 |
| Heat Deformation, 121° C., 250 g, 1 h | 19.6 | 21.4 | 12.0 | 19.2 |

EXAMPLES 8 AND 9, COMPARATIVE EXAMPLES 10 AND 11

These examples illustrate the improved properties obtained by substituting a poly(arylene ether)-polysiloxane block copolymer reaction product for a poly(arylene ether) in a composition using a metal dialkylphosphinate flame retardant.

These examples illustrate the use of a flame retardant combination of triaryl phosphate and metal dialkylphosphinate.

Compositions were prepared and tested as described above. Compositions and properties are summarized in Table 7.

For material property values, pair-wise comparisons of comparative examples with poly(arylene ether) homopolymer to the corresponding inventive examples with poly (arylene ether)-polysiloxane block copolymer show improved tensile elongation and flame retardancy for the inventive examples. Specifically, with respect to tensile elongation, Comparative Example 10 exhibited a value of 38.2%, versus a value of 49.6% for Example 8; and Comparative Example 11 exhibited a value of 98% versus a value of 128% for Example 9. With respect to UL94 Vertical Burn flame out times determined at a sample thickness of 6.4 millimeters, Comparative Example 10 exhibited an average value of 172.6 seconds, versus an average value of 37.4 seconds for Example 8; and Comparative Example 11 exhibited an average value of 100.2 seconds, versus an average value of 10.6 seconds for Example 9.

For wire property values, pair-wise comparisons of comparative examples with poly(arylene ether) homopolymer to the corresponding inventive examples with poly(arylene ether)-polysiloxane block copolymer show improved tensile elongation for both inventive samples, and improved VW-1 flame retardancy for one of the two inventive samples. Specifically, with respect to wire tensile elongation, Comparative Example 10 exhibited a value of 117%, versus a value of 130% for Example 8; and Comparative Example 11 exhibited a value of 170% versus a value of 187% for Example 9. With respect to VW-1, 1C/FOT (sec), Comparative Example 10 failed the test (that is, it exhibited a flame out time longer than 60 seconds or/and more than 25% of the indicator flag is burned out), whereas Example 8 exhibited an average flame-out time of 13.3 seconds.

TABLE 7

| | C. Ex. 10 | Ex. 8 | C. Ex. 11 | Ex. 9 |
|---|---|---|---|---|
| COMPOSITIONS | | | | |
| PPE-46 | 35 | 0 | 30 | 0 |
| PPE-Si | 0 | 35 | 0 | 30 |
| Polybutene | 8 | 8 | 6 | 6 |
| SEBS I | 0 | 0 | 15 | 15 |
| SEBS III | 14 | 14 | 0 | 0 |
| SEBS IV | 7 | 7 | 0 | 0 |
| PP | 10 | 10 | 15 | 15 |
| POE | 10 | 10 | 18 | 18 |
| DEPAL | 3 | 3 | 6 | 6 |
| BPADP | 13 | 13 | 10 | 10 |
| Additives | 1.6 | 1.6 | 1.6 | 1.6 |
| TOTAL (pbw) | 101.6 | 101.6 | 101.6 | 101.6 |
| Total HBC (%) | 20.7 | 20.7 | 14.8 | 14.8 |
| Total PO (%) | 43.2 | 43.2 | 47.2 | 47.2 |
| (Total PO)/PPE | 1.3 | 1.3 | 1.6 | 1.6 |
| (Total PO)/(PPE + FR) | 0.9 | 0.9 | 1.0 | 1.0 |
| PO (%) | 27.6 | 27.6 | 38.4 | 38.4 |
| PO/(PPE + FR) | 0.5 | 0.5 | 0.8 | 0.8 |
| MATERIAL PROPERTIES | | | | |
| MFR, 250° C., 10 kg (g/10 min) | 8.0 | 7.7 | 22.2 | 22.3 |
| Flexural Modulus (MPa) | 501 | 388 | 182 | 126 |
| Modulus of Elasticity (MPa) | 159.8 | 146.6 | 98.4 | 80.4 |
| Shore A Hardness | 93.2 | 92.9 | 95 | 94 |
| Tensile Stress (MPa) | 13.9 | 13.6 | 12.6 | 10.9 |
| Tensile Elongation (%) | 38.2 | 49.6 | 98 | 128 |
| FOT UL94V, 3.2 mm (sec) | — | — | — | 40.3 |
| FOT UL94V, 6.4 mm (sec) | 172.6 | 37.4 | 100.2 | 10.6/V1 |

TABLE 7-continued

|  | C. Ex. 10 | Ex. 8 | C. Ex. 11 | Ex. 9 |
|---|---|---|---|---|
| WIRE PROPERTIES | | | | |
| VW-1, 2C/FOT (sec) | F | F | F | F |
| VW-1, 1C/FOT (sec) | F | 13.3 | F | F |
| Tensile Stress (MPa) | 19.7 | 17.8 | 20.4 | 17.6 |
| Tensile Elongation (%) | 117 | 130 | 170 | 187 |
| Heat Deformation, 121° C., 250 g, 1 h | 9 | 12 | 7 | 10 |

EXAMPLES 10-25, COMPARATIVE EXAMPLES 12-29

These examples illustrate the improved properties obtained by substituting a poly(arylene ether)-polysiloxane block copolymer reaction product for a poly(arylene ether) in a composition using a triaryl phosphate as flame retardant.

Compositions were prepared and tested as described above. Compositions and properties are summarized in Table 8.

For material property values, pair-wise comparisons of comparative examples with poly(arylene ether) homopolymer to the corresponding inventive examples with poly(arylene ether)-polysiloxane block copolymer show improved flame retardancy for the inventive examples. Specifically, with respect to flame out times for the UL 94 Vertical Burning test at a sample thickness of 6.4 millimeters, Comparative Example 15 exhibited an average value of 25.2 seconds (UL94 V-1 rating), versus an average value of 5.4 seconds for Example 14 (UL94 V0 rating); Comparative Example 16 exhibited an average value of 315.9 seconds (failed UL94), versus an average value of 6.3 seconds for Example 15 (UL94 V0 rating); Comparative Example 19 exhibited an average value of 289.0 seconds (failed UL94), versus an average value of 7.8 seconds for Example 16 (UL94 V0 rating); Comparative Example 21 exhibited an average value of 277.8 seconds (failed UL94), versus an average value of 20.7 seconds for Example 17 (UL94 V-1 rating); Comparative Example 22 exhibited an average value of 268.5 seconds (failed UL94), versus an average value of 28.5 seconds for Example 18 (UL94 V-1 rating); Comparative Example 23 exhibited an average value of 174.0 seconds (failed UL94), versus an average value of 19.0 seconds for Example 19 (UL94 V-1 rating); Comparative Example 24 exhibited an average value of 300.4 seconds (failed UL94), versus an average value of 51.6 seconds for Example 20; Comparative Example 25 exhibited an average value of 461.4 seconds (failed UL94), versus an average value of 23.5 seconds for Example 21 (UL94 V-1 rating); Comparative Example 26 exhibited an average value of 201 seconds (failed UL94), versus an average value of 5.8 seconds for Example 22 (UL94 V-0 rating); Comparative Example 27 exhibited an average value of 288.9 seconds (failed UL94), versus an average value of 11.5 seconds for Example 23 (UL94 V-1 rating); Comparative Example 28 exhibited an average value of 133.6 seconds (failed UL94), versus an average value of 26.4 seconds for Example 24 (UL94 V-1 rating); Comparative Example 29 exhibited an average value of 240.9 seconds (failed UL94), versus an average value of 48.7 seconds for Example 25 (UL94 failed UL94).

For wire property values, pair-wise comparisons of comparative examples with poly(arylene ether) homopolymer to the corresponding inventive examples with poly(arylene ether)-polysiloxane block copolymer show improved VW-1 flame retardancy, although for three of the thirteen sample pairs no improvement was seen. Specifically, with respect to the VW-1, 1C flame-out time, Comparative Example 12 failed the test, whereas Example 10 exhibited an average value of 15.0 seconds; Comparative Example 13 exhibited an average value of 16.0 seconds, versus an average value of 8.3 seconds for Example 11; Comparative Example 15 exhibited an average value of 15 seconds and failed 2C VW-1, versus an average value of 6 seconds for Example 14 and passed 2C VW-1, which means more robust FR performance for different wire configurations; Comparative Example 16 failed the test, whereas Example 15 exhibited an average value of 9 seconds and passed VW-1/2C; Comparative Example 19 failed the test, whereas Example 16 exhibited an average value of 9 seconds and failed the test (note that it is possible to calculate an average flame out time value for some but not all failing samples); Comparative Example 21 failed the test, whereas Example 17 exhibited an average value of 8.3 seconds and passed VW-1/2C; Comparative Example 22 failed the test, whereas Example 18 exhibited an average value of 6 seconds and passed VW-1/2C; Comparative Example 23 failed the test, whereas Example 19 exhibited an average value of 8 seconds and failed the test; Comparative Example 24 failed the test, whereas Example 20 exhibited an average value of 10 seconds and failed the test; Comparative Example 25 failed the test, whereas Example 21 exhibited an average value of 17 seconds and passed VW-1/2C; Comparative Example 26 failed the test, whereas Example 22 exhibited an average value of 5.3 seconds and passed VW-1/2C.

TABLE 8

|  | C. Ex. 12 | Ex. 10 | C. Ex. 13 | C. Ex. 14 | Ex. 11 |
|---|---|---|---|---|---|
| COMPOSITIONS | | | | | |
| PPE-46 | 52 | 0 | 40 | 0 | 0 |
| PPE-40 | 0 | 0 | 0 | 40 | 0 |
| PPE-Si | 0 | 52 | 0 | 0 | 40 |
| SEBS V | 5 | 5 | 0 | 0 | 0 |
| SEBS III | 0 | 0 | 20 | 20 | 20 |
| SEBS I | 5 | 5 | 27 | 27 | 27 |
| TPE | 0 | 0 | 0 | 0 | 0 |
| SEBS IV | 0 | 0 | 0 | 0 | 0 |
| Polybutene | 0 | 0 | 0 | 0 | 0 |
| PP | 29 | 29 | 0 | 0 | 0 |
| POE | 0 | 0 | 0 | 0 | 0 |
| BPADP | 9 | 9 | 0 | 0 | 0 |
| RDP | 0 | 0 | 13 | 13 | 13 |

TABLE 8-continued

|  |  |  |  |  |  |
|---|---|---|---|---|---|
| Citric Acid | 0 | 0 | 0 | 0 | 0 |
| SIA | 0 | 0 | 0 | 0 | 0 |
| Additives | 0.3 | 0.3 | 1.3 | 1.3 | 1.3 |
| TOTAL (pbw) | 100.3 | 100.3 | 101.3 | 101.3 | 101.3 |
| Total HBC content (%) | 10.0 | 10.0 | 46.4 | 46.4 | 46.4 |
| Total PO content (%) | 33.8 | 33.8 | 29.8 | 29.8 | 29.8 |
| (Total PO)/PPE | 0.7 | 0.7 | 0.8 | 0.8 | 0.8 |
| (Total PO)/(PPE + FR) | 0.6 | 0.6 | 0.6 | 0.6 | 0.6 |
| PO (%) | 28.9 | 28.9 | 0 | 0 | 0 |
| PO/(PPE + FR) | 0.5 | 0.5 | 0 | 0 | 0 |

MATERIAL PROPERTIES

|  |  |  |  |  |  |
|---|---|---|---|---|---|
| MFR, 250° C., 5 kg (g/10 min) | — | — | — | — | — |
| Flexural Modulus (MPa) | — | — | — | — | — |
| Modulus of Elasticity (MPa) | — | — | — | — | — |
| Shore A Hardness | — | — | — | — | — |
| Tensile Stress (MPa) | — | — | — | — | — |
| Tensile Elongation (%) | — | — | — | — | — |
| FOT UL94V, 6.4 mm (sec) | — | — | — | — | — |

WIRE PROPERTIES

|  |  |  |  |  |  |
|---|---|---|---|---|---|
| FOT, VW-1/1C (sec) | F | 15.0 | 16.0 | 24.0 | 8.3 |
| FOT, VW-1/2C (sec) | — | — | 44.0 | 37.0 | 26.0 |
| Tensile Stress (MPa) | 56.2 | 43.4 | 36.6 | 34.2 | 31.2 |
| Tensile Elongation (%) | 170 | 77 | 190 | 183 | 187 |
| Heat Deformation, 100° C., 250 g, 1 h (%) | — | — | — | — | — |
| Heat Deformation, 121° C., 250 g, 1 h (%) | 2.7 | 3.5 | 12.2 | 19.0 | 23.0 |

|  | Ex. 12 | Ex. 13 | C. Ex. 15 | Ex. 14 |
|---|---|---|---|---|

COMPOSITIONS

|  |  |  |  |  |
|---|---|---|---|---|
| PPE-46 | 0 | 0 | 40 | 0 |
| PPE-40 | 0 | 0 | 0 | 0 |
| PPE-Si | 40 | 40 | 0 | 40 |
| SEBS V | 0 | 0 | 0 | 0 |
| SEBS III | 20 | 20 | 0 | 0 |
| SEBS I | 27 | 30 | 30 | 30 |
| TPE | 0 | 0 | 9 | 9 |
| SEBS IV | 0 | 0 | 0 | 0 |
| Polybutene | 3 | 3 | 8 | 8 |
| PP | 0 | 0 | 0 | 0 |
| POE | 0 | 0 | 0 | 0 |
| BPADP | 0 | 0 | 13 | 13 |
| RDP | 10 | 7 | 0 | 0 |
| Citric Acid | 0 | 0 | 0 | 0 |
| SIA | 0 | 0 | 0 | 0 |
| Additives | 1.3 | 1.3 | 1.75 | 1.75 |
| TOTAL | 101.3 | 101.3 | 101.8 | 101.8 |
| Total HBC content (%) | 46.4 | 49.4 | 32.6 | 32.6 |
| Total PO content (%) | 32.8 | 34.6 | 33.5 | 33.5 |
| PO/PPE | 0.8 | 0.9 | 0.9 | 0.9 |
| (Total PO)/PPE | 0.7 | 0.7 | 0.6 | 0.6 |
| (Total PO)/(PPE + FR) | 0.7 | 0.7 | 0.6 | 0.6 |
| PO (%) | 3.0 | 3.0 | 13.6 | 13.6 |
| PO/(PPE + FR) | 0.1 | 0.1 | 0.3 | 0.3 |

MATERIAL PROPERTIES

|  |  |  |  |  |
|---|---|---|---|---|
| MFR, 250° C., 5 kg (g/10 min) | — | — | 19.8 | 14.7 |
| Flexural Modulus (MPa) | — | — | — | — |
| Modulus of Elasticity (MPa) | — | — | 235.2 | 195.8 |
| Shore A Hardness | — | — | 92 | 92 |
| Tensile Stress (MPa) | — | — | 21 | 18.7 |
| Tensile Elongation (%) | — | — | 73 | 66 |
| FOT UL94V, 6.4 mm (sec) | — | — | 25.2/V-1 | 5.4/V-0 |

WIRE PROPERTIES

|  |  |  |  |  |
|---|---|---|---|---|
| FOT, VW-1/1C (sec) | 7.0 | 18.3 | 15 | 6 |
| FOT, VW-1/2C (sec) | 30.0 | 30.7 | F | 22 |
| Tensile Stress (MPa) | 27.3 | 28.8 | 28.2 | 24.4 |
| Tensile Elongation (%) | 174 | 177 | 177 | 177 |
| Heat Deformation, 100° C., 250 g, 1 h (%) | — | — | — | — |
| Heat Deformation, 121° C., 250 g, 1 h (%) | 15.0 | 8.3 | 38.6 | 47.0 |

TABLE 8-continued

|  | C. Ex. 16 | C. Ex. 17 | C. Ex. 18 | Ex. 15 |
|---|---|---|---|---|
| COMPOSITIONS | | | | |
| PPE-46 | 40 | 0 | 40 | 0 |
| PPE-40 | 0 | 40 | 0 | 0 |
| PPE-Si | 0 | 0 | 0 | 40 |
| SEBS V | 0 | 0 | 0 | 0 |
| SEBS III | 0 | 0 | 0 | 0 |
| SEBS I | 30 | 30 | 30 | 30 |
| TPE | 10 | 10 | 10 | 10 |
| SEBS IV | 0 | 0 | 0 | 0 |
| Polybutene | 8 | 8 | 8 | 8 |
| PP | 0 | 0 | 0 | 0 |
| POE | 0 | 0 | 0 | 0 |
| BPADP | 10 | 10 | 10 | 10 |
| RDP | 0 | 0 | 0 | 0 |
| Citric Acid | 0 | 0 | 0.25 | 0 |
| SIA | 0 | 0 | 1.75 | 0 |
| Additives | 1.75 | 1.75 | 1.75 | 1.75 |
| TOTAL (pbw) | 99.75 | 99.75 | 101.8 | 99.75 |
| Total HBC content (%) | 33.6 | 33.6 | 32.9 | 33.6 |
| Total PO content (%) | 35.0 | 35.0 | 34.3 | 35.0 |
| (Total PO)/PPE | 0.9 | 0.9 | 0.9 | 0.9 |
| (Total PO)/(PPE + FR) | 0.7 | 0.7 | 0.7 | 0.7 |
| PO (%) | 14.5 | 14.5 | 14.3 | 14.5 |
| PO/(PPE + FR) | 0.3 | 0.3 | 0.3 | 0.3 |
| MATERIAL PROPERTIES | | | | |
| MFR, 250° C., 5 kg (g/10 min) | 33.7 | 34.2 | 33.2 | 44.5 |
| Flexural Modulus (MPa) | 281 | 266 | 219 | 296 |
| Modulus of Elasticity (MPa) | 152.8 | 155.8 | 105.6 | 185 |
| Shore A Hardness | 91 | 90 | 90 | 91 |
| Tensile Stress (MPa) | 19.1 | 19.2 | 17.3 | 16.6 |
| Tensile Elongation (%) | 73 | 61 | 75 | 59 |
| FOT UL94V, 6.4 mm (sec) | 315.9 | 268.7 | 23.1/V-1 | 6.3/V-0 |
| WIRE PROPERTIES | | | | |
| FOT, VW-1/1C (sec) | F | F | F | 9 |
| FOT, VW-1/2C (sec) | F | F | F | 26 |
| Tensile Stress (MPa) | 27.5 | 27.4 | 26.4 | 23.3 |
| Tensile Elongation (%) | 188 | 184 | 174 | 181 |
| Heat Deformation, 100° C., 250 g, 1 h (%) | 4.9 | 5.3 | 4.0 | 5.8 |
| Heat Deformation, 121° C., 250 g, 1 h (%) | — | — | — | — |

|  | C. Ex. 19 | C. Ex. 20 | Ex. 16 |
|---|---|---|---|
| COMPOSITIONS | | | |
| PPE-46 | 40 | 0 | 0 |
| PPE-40 | 0 | 40 | 0 |
| PPE-Si | 0 | 0 | 40 |
| SEBS V | 0 | 0 | 0 |
| SEBS III | 0 | 0 | 0 |
| SEBS I | 30 | 30 | 30 |
| TPE | 12 | 12 | 12 |
| SEBS IV | 0 | 0 | 0 |
| Polybutene | 8 | 8 | 8 |
| PP | 0 | 0 | 0 |
| POE | 0 | 0 | 0 |
| BPADP | 10 | 10 | 10 |
| RDP | 0 | 0 | 0 |
| Citric Acid | 0 | 0 | 0 |
| Additives | 1.75 | 1.75 | 1.75 |
| SIA | 0 | 0 | 0 |
| TOTAL (pbw) | 101.8 | 101.8 | 101.8 |
| Total HBC content (%) | 33.6 | 33.6 | 33.6 |
| Total PO content (%) | 36.1 | 36.1 | 36.1 |
| (Total PO)/PPE | 0.9 | 0.9 | 0.9 |
| (Total PO)/(PPE + FR) | 0.7 | 0.7 | 0.7 |
| PO (%) | 15.5 | 15.5 | 15.5 |
| PO/(PPE + FR) | 0.3 | 0.3 | 0.3 |
| MATERIAL PROPERTIES | | | |
| MFR, 250° C., 5 kg (g/10 min) | — | 39.7 | 48.9 |
| Flexural Modulus (MPa) | — | — | — |
| Modulus of Elasticity (MPa) | 93.6 | 129.4 | 137 |

TABLE 8-continued

|  | | | | |
|---|---|---|---|---|
| Shore A Hardness | 86.7 | 89 | 90 | |
| Tensile Stress (MPa) | 18.4 | 19.5 | 17.7 | |
| Tensile Elongation (%) | 289 | 88 | 79 | |
| FOT UL94V, 6.4 mm (sec) | 289.0 | 323 | 7.8/V-0 | |
| WIRE PROPERTIES | | | | |
| FOT, VW-1/1C (sec) | F | F | 9 | |
| FOT, VW-1/2C (sec) | — | — | F | |
| Tensile Stress (MPa) | 28.3 | 26.2 | 25.1 | |
| Tensile Elongation (%) | 210 | 177 | 198 | |
| Heat Deformation, 100° C., 250 g, 1 h (%) | 8.4 | — | — | |
| Heat Deformation, 121° C., 250 g, 1 h (%) | — | 22.4 | 29.7 | |

|  | C. Ex. 21 | Ex. 17 | C. Ex. 22 | Ex. 18 | C. Ex. 23 | Ex. 19 |
|---|---|---|---|---|---|---|
| COMPOSITIONS | | | | | | |
| PPE-46 | 40 | 0 | 38 | 0 | 36 | 0 |
| PPE-40 | 0 | 0 | 0 | 0 | 0 | 0 |
| PPE-Si | 0 | 40 | 0 | 38 | 0 | 36 |
| SEBS V | 0 | 0 | 0 | 0 | 0 | 0 |
| SEBS III | 0 | 0 | 0 | 0 | 0 | 0 |
| SEBS I | 25 | 25 | 27 | 27 | 26 | 26 |
| TPE | 0 | 0 | 12 | 12 | 0 | 0 |
| SEBS IV | 12 | 12 | 0 | 0 | 15 | 15 |
| Polybutene | 10 | 10 | 5 | 5 | 10 | 10 |
| PP | 0 | 0 | 5 | 5 | 0 | 0 |
| POE | 0 | 0 | 0 | 0 | 0 | 0 |
| BPADP | 13 | 13 | 13 | 13 | 13 | 13 |
| RDP | 0 | 0 | 0 | 0 | 0 | 0 |
| Citric Acid | 0 | 0 | 0 | 0 | 0 | 0 |
| SIA | 0 | 0 | 0 | 0 | 0 | 0 |
| Additives | 1.9 | 1.9 | 1.9 | 1.9 | 1.9 | 1.9 |
| TOTAL (pbw) | 101.9 | 101.9 | 101.9 | 101.9 | 101.9 | 101.9 |
| Total HBC content (%) | 36.3 | 36.3 | 30.6 | 30.6 | 40.2 | 40.2 |
| Total PO content (%) | 34.8 | 34.8 | 36.8 | 36.8 | 37.9 | 37.9 |
| (Total PO)/PPE | 0.9 | 0.9 | 1.0 | 1.0 | 1.1 | 1.1 |
| (Total PO)/(PPE + FR) | 0.7 | 0.7 | 0.7 | 0.7 | 0.8 | 0.8 |
| PO (%) | 9.8 | 9.8 | 17.5 | 17.5 | 9.8 | 9.8 |
| PO/(PPE + FR) | 0.2 | 0.2 | 0.3 | 0.3 | 0.2 | 0.2 |
| MATERIAL PROPERTIES | | | | | | |
| MFR, 250° C., 5 kg (g/10 min) | 25.1 | 20.9 | 9.18 | 6.69 | 22.6 | 22.1 |
| Flexural Modulus (MPa) | 226 | 105 | 562 | 440 | 190 | 178.3 |
| Modulus of Elasticity (MPa) | 117 | 60.6 | 279.2 | 221.4 | 101.6 | 37.4 |
| Shore A Hardness | 87 | 85 | 94 | 93 | 85 | 82 |
| Tensile Stress (MPa) | 19.5 | 14.2 | 23.8 | 23.1 | 18 | 11.2 |
| Tensile Elongation (%) | 63 | 91 | 55 | 81 | 86 | 104 |
| FOT UL94V, 6.4 mm (sec) | 277.8 | 20.7/V-1 | 268.5 | 28.5/V-1 | 174.0 | 19.0/V-1 |
| WIRE PROPERTIES | | | | | | |
| FOT, VW-1/1C (sec) | F | 8.3 | F | 6 | F | 8 |
| FOT, VW-1/2C (sec) | F | 24.7 | F | 33 | F | F |
| Tensile Stress (MPa) | 24.4 | 24.6 | 32.1 | 29.7 | 22.6 | 22.0 |
| Tensile Elongation (%) | 166 | 183 | 186 | 202 | 182 | 198 |
| Heat Deformation, 100° C., 250 g, 1 h (%) | 13.1 | 16.7 | — | — | 18.8 | 31.0 |
| Heat Deformation, 121° C., 250 g, 1 h (%) | — | — | 17.0 | 21.0 | — | — |

|  | C. Ex. 24 | Ex. 20 | C. Ex. 25 | Ex. 21 |
|---|---|---|---|---|
| COMPOSITIONS | | | | |
| PPE-46 | 35 | 0 | 35 | 0 |
| PPE-40 | 0 | 0 | 0 | 0 |
| PPE-Si | 0 | 35 | 0 | 35 |
| SEBS V | 0 | 0 | 0 | 0 |
| SEBS III | 10 | 10 | 15 | 15 |
| SEBS I | 27 | 27 | 27 | 27 |
| TPE | 0 | 0 | 0 | 0 |
| SEBS IV | 0 | 0 | 0 | 0 |
| Polybutene | 5 | 5 | 0 | 0 |
| PP | 10 | 10 | 10 | 10 |
| POE | 0 | 0 | 0 | 0 |
| BPADP | 0 | 0 | 13 | 13 |
| RDP | 13 | 13 | 0 | 0 |
| Citric Acid | 0 | 0 | 0 | 0 |

TABLE 8-continued

|  |  |  |  |  |
|---|---|---|---|---|
| SIA | 0 | 0 | 0 | 0 |
| Additives | 1.9 | 1.9 | 1.9 | 1.9 |
| TOTAL | 101.9 | 101.9 | 101.9 | 101.9 |
| Total HBC content (%) | 36.3 | 36.3 | 41.2 | 41.2 |
| Total PO content (%) | 39.2 | 39.2 | 38.5 | 38.5 |
| (Total PO)/PPE | 1.1 | 1.1 | 1.1 | 1.1 |
| (Total PO)/(PPE + FR) | 0.8 | 0.8 | 0.8 | 0.8 |
| PO (%) | 14.7 | 14.7 | 9.8 | 9.8 |
| PO/(PPE + FR) | 0.3 | 0.3 | 0.2 | 0.2 |
| MATERIAL PROPERTIES | | | | |
| MFR, 250° C., 10 kg (g/10 min) | 14.6 | 11.5 | 6.16 | 3.72 |
| Flexural Modulus (MPa) | 412 | 277 | 660 | 554 |
| Modulus of Elasticity (MPa) | 198.8 | 127.6 | 354.8 | 259.4 |
| Shore A Hardness | 94 | 92 | 95 | 95 |
| Tensile Stress (MPa) | 23.1 | 19.1 | 25.2 | 23.3 |
| Tensile Elongation (%) | 126 | 130 | 77 | 81 |
| FOT UL94V, 6.4 mm (sec) | 300.4 | 51.6 | 461.4 | 23.5 |
| WIRE PROPERTIES | | | | |
| FOT, VW-1/1C (sec) | F | 10 | F | 17 |
| FOT, VW-1/2C (sec) | F | F | F | 27 |
| Tensile Stress (MPa) | 29.1 | 32.1 | 33.5 | 34.7 |
| Tensile Elongation (%) | 218 | 236 | 197 | 216 |
| Heat Deformation, 100° C., 250 g, 1 h (%) | — | — | — | 13 |
| Heat Deformation, 121° C., 250 g, 1 h (%) | 25.7 | 24.2 | 18.5 | 17.4 |

|  | C. Ex. 26 | Ex. 22 | C. Ex. 27 | Ex. 23 |
|---|---|---|---|---|
| COMPOSITIONS | | | | |
| PPE-46 | 35 | 0 | 35 | 0 |
| PPE-40 | 0 | 0 | 0 | 0 |
| PPE-Si | 0 | 35 | 0 | 35 |
| SEBS V | 0 | 0 | 0 | 0 |
| SEBS III | 0 | 0 | 0 | 0 |
| SEBS I | 14 | 14 | 27 | 27 |
| TPE | 0 | 0 | 10 | 10 |
| SEBS IV | 28 | 28 | 0 | 0 |
| Polybutene | 8 | 8 | 8 | 8 |
| PP | 0 | 0 | 10 | 10 |
| POE | 0 | 0 | 0 | 0 |
| BPADP | 15 | 15 | 0 | 0 |
| RDP | 0 | 0 | 10 | 10 |
| Citric Acid | 0 | 0 | 0 | 0 |
| SIA | 0 | 0 | 0 | 0 |
| Additives | 1.75 | 1.75 | 1.75 | 1.75 |
| TOTAL (pbw) | 101.8 | 101.8 | 101.9 | 101.9 |
| Total HBC content (%) | 41.3 | 41.3 | 29.9 | 29.9 |
| Total PO content (%) | 40.1 | 40.1 | 42.3 | 42.3 |
| (Total PO)/PPE | 1.2 | 1.2 | 1.2 | 1.2 |
| (Total PO)/(PPE + FR) | 0.8 | 0.8 | 1.0 | 1.0 |
| PO (%) | 7.9 | 7.9 | 24.0 | 24.0 |
| PO/(PPE + FR) | 0.2 | 0.2 | 0.5 | 0.5 |
| MATERIAL PROPERTIES | | | | |
| MFR, 250° C., 5 kg (g/10 min) | 33.4 | 35.9 | 51.3 | 48.7 |
| Flexural Modulus (MPa) | — | — | 116 | 83.4 |
| Modulus of Elasticity (MPa) | 166 | 272.4 | 66 | 49.8 |
| Shore A Hardness | 86 | 87 | 89 | 87 |
| Tensile Stress (MPa) | 17.9 | 17.2 | 22 | 19.3 |
| Tensile Elongation (%) | 89 | 81 | 196 | 213 |
| FOT UL94V, 6.4 mm (sec) | 201 | 5.8 | 288.9 | 11.5 |
| WIRE PROPERTIES | | | | |
| FOT, VW-1/1C (sec) | F | 5.3 | F | F |
| FOT, VW-1/2C (sec) | NA | 26.7 | F | 10.7 |
| Tensile Stress (MPa) | 22.3 | 22.1 | 29.5 | 27.1 |
| Tensile Elongation (%) | 202 | 241 | 243 | 240 |
| Heat Deformation, 100° C., 250 g, 1 h (%) | — | — | — | — |
| Heat Deformation, 121° C., 250 g, 1 h (%) | 87.3 | 92.8 | 28 | 33 |

TABLE 8-continued

| | C. Ex. 28 | Ex. 24 | C. Ex. 29 | Ex. 25 |
|---|---|---|---|---|
| COMPOSITIONS | | | | |
| PPE-46 | 30 | 0 | 30 | 0 |
| PPE-40 | 0 | 0 | 0 | 0 |
| PPE-Si | 0 | 30 | 0 | 30 |
| SEBS V | 0 | 0 | 0 | 0 |
| SEBS III | 0 | 0 | 0 | 0 |
| SEBS I | 15 | 15 | 27 | 27 |
| TPE | 0 | 0 | 10 | 10 |
| SEBS IV | 0 | 0 | 0 | 0 |
| Polybutene | 6 | 6 | 8 | 8 |
| PP | 15 | 15 | 15 | 15 |
| POE | 18 | 18 | 0 | 0 |
| BPADP | 16 | 16 | 0 | 0 |
| RDP | 0 | 0 | 10 | 10 |
| Citric Acid | 0 | 0 | 0 | 0 |
| SIA | 0 | 0 | 0 | 0 |
| Additives | 1.8 | 1.8 | 1.8 | 1.8 |
| TOTAL (pbw) | 101.9 | 101.9 | 101.9 | 101.9 |
| Total HBC content (%) | 14.7 | 14.7 | 29.9 | 29.9 |
| Total PO content (%) | 47.1 | 47.1 | 47.3 | 47.3 |
| (Total PO)/PPE | 1.6 | 1.6 | 1.6 | 1.6 |
| (Total PO)/(PPE + FR) | 1.0 | 1.0 | 1.2 | 1.2 |
| PO (%) | 38.3 | 38.3 | 28.9 | 28.9 |
| PO/(PPE + FR) | 0.8 | 0.8 | 0.7 | 0.7 |
| MATERIAL PROPERTIES | | | | |
| MFR, 250° C., 5 kg (g/10 min) | 42.5 | 35.2 | 59.5 | 68.4 |
| Flexural Modulus (MPa) | 346 | 253 | 95 | 92.9 |
| Modulus of Elasticity (MPa) | 226.6 | 184.4 | 68.8 | 59.2 |
| Shore A Hardness | 95 | 94 | 89 | 88 |
| Tensile Stress (MPa) | 19.1 | 15.8 | 21.7 | 20.1 |
| Tensile Elongation (%) | 90 | 109 | 262 | 278 |
| FOT UL94V, 6.4 mm (sec) | 133.6 | 26.4/V-1 | 240.9 | 48.7 |
| WIRE PROPERTIES | | | | |
| FOT, VW-1/1C (sec) | F | F | F | F |
| FOT, VW-1/2C (sec) | F | F | F | F |
| Tensile Stress (MPa) | 24.0 | 22.2 | 28.6 | 27.7 |
| Tensile Elongation (%) | 168 | 188 | 273 | 289 |
| Heat Deformation, 100° C., 250 g, 1 h (%) | 24.9 | 27.9 | — | — |
| Heat Deformation, 121° C., 250 g, 1 h (%) | — | — | 20 | 28 |

EXAMPLES 26-30, COMPARATIVE EXAMPLES 30-34

These examples illustrate the improved properties obtained by substituting a poly(arylene ether)-polysiloxane block copolymer reaction product for a poly(arylene ether) in a composition using a flame retardant including magnesium hydroxide, optionally in combination with zinc borate.

Compositions were prepared and tested as described above. Compositions and properties are summarized in Table 9.

For material property values, pair-wise comparisons of comparative examples with poly(arylene ether) homopolymer to the corresponding inventive examples with poly(arylene ether)-polysiloxane block copolymer show improved tensile elongation and flame retardancy for the inventive examples. Specifically, with respect to tensile elongation, Comparative Example 30 exhibited a value of 59%, versus a value of 67% for Example 26; Comparative Example 31 exhibited a value of 98%, versus a value of 104% for Example 27; Comparative Example 32 exhibited a value of 81%, versus a value of 110% for Example 28; Comparative Example 33 exhibited a value of 84%, versus a value of 108% for Example 29; and Comparative Example 34 exhibited a value of 94%, versus a value of 109% for Example 30. With respect to flame out times for the UL 94 Vertical Burning test at a sample thickness of 6.4 millimeters, Comparative Example 30 exhibited an average value of 38.7 seconds, versus an average value of 12.9 seconds for Example 26; Comparative Example 31 exhibited an average value of 171.1 seconds, versus an average value of 10.4 seconds for Example 27; Comparative Example 32 exhibited an average value of 144.1 seconds, versus an average value of 8.9 seconds for Example 28; Comparative Example 33 exhibited an average value of 90.6 seconds, versus an average value of 8.4 seconds for Example 29; Comparative Example 34 exhibited an average value of 201.2 seconds, versus an average value of 65.7 seconds for Example 30. The UL 94 flame retardancy advantages of the inventive examples were not observed in the VW-1 test, where all samples (inventive and comparative) failed the VW-1 test.

TABLE 9

|  | C. Ex. 30 | Ex. 26 | C. Ex. 31 | Ex. 27 | C. Ex. 32 | Ex. 28 |
|---|---|---|---|---|---|---|
| COMPOSITIONS | | | | | | |
| PPE-46 | 40 | 0 | 35 | 0 | 35 | 0 |
| PPE-Si | 0 | 40 | 0 | 35 | 0 | 35 |
| Polybutene | 3 | 3 | 5 | 5 | 5 | 5 |
| PP | 5 | 5 | 5 | 5 | 5 | 5 |
| POE-g-MAH | 5 | 5 | 5 | 5 | 5 | 5 |
| SEBS I | 22 | 22 | 25 | 25 | 25 | 25 |
| Mg(OH)$_2$ | 20 | 20 | 25 | 25 | 20 | 20 |
| ZB | 5 | 5 | 0 | 0 | 5 | 5 |
| SIA | 2 | 2 | 0 | 0 | 0 | 0 |
| Additives | 1.15 | 1.15 | 1.15 | 1.15 | 1.15 | 1.15 |
| Melamine Cyanurate | 0 | 0 | 0 | 0 | 0 | 0 |
| TOTAL (pbw) | 103.2 | 103.2 | 101.2 | 101.2 | 101.2 | 101.2 |
| Total HBC content (%) | 21.3 | 21.3 | 24.7 | 24.7 | 24.7 | 24.7 |
| Total PO content (%) | 25.3 | 25.3 | 29.6 | 29.6 | 29.6 | 29.6 |
| (Total PO)/PPE | 0.7 | 0.7 | 0.9 | 0.9 | 0.9 | 0.9 |
| (Total PO)/(PPE + FR) | 0.4 | 0.4 | 0.5 | 0.5 | 0.5 | 0.5 |
| PO (%) | 12.6 | 12.6 | 14.8 | 14.8 | 14.8 | 14.8 |
| PO/(PPE + FR) | 0.2 | 0.2 | 0.3 | 0.3 | 0.3 | 0.3 |
| MATERIAL PROPERTIES | | | | | | |
| MFR, 250° C., 5 kg (g/10 min) | 3.0 | 2.7 | 9.0 | 11.7 | 19.2 | 8.4 |
| Flexural Modulus (MPa) | 220 | 207 | 131 | 116 | 128 | 101 |
| Modulus of Elasticity (MPa) | 94.8 | 93.6 | 117 | 82 | 82 | 65.6 |
| Shore A Hardness | 96 | 97 | 93 | 93 | 94 | 93 |
| Tensile Stress (MPa) | 17.2 | 14 | 14.9 | 14.5 | 12.4 | 13.6 |
| Tensile Elongation (%) | 59 | 67 | 98 | 104 | 81 | 110 |
| FOT UL94V, 6.4 mm (sec) | 38.7 | 12.9 | 171.1 | 10.4 | 144.1 | 8.9 |
| WIRE PROPERTIES | | | | | | |
| FOT, VW-1/1C (sec) | F | F | F | F | F | F |
| FOT, VW-1/2C (sec) | F | F | F | F | F | F |
| Tensile Stress (MPa) | 29.3 | 23.9 | 25.6 | 24.9 | 27.0 | 25.7 |
| Tensile Elongation (%) | 134 | 125 | 194 | 195 | 198 | 213 |
| Heat Deformation, 100° C., 250 g, 1 h (%) | 0.9 | 2.0 | 2.5 | 1.6 | 2.0 | 2.3 |

|  | C. Ex. 33 | Ex. 29 | C. Ex. 34 | Ex. 30 |
|---|---|---|---|---|
| COMPOSITIONS | | | | |
| PPE-46 | 35 | 0 | 35 | 0 |
| PPE-Si | 0 | 35 | 0 | 35 |
| Polybutene | 5 | 5 | 5 | 5 |
| PP | 5 | 5 | 5 | 5 |
| POE-g-MAH | 5 | 5 | 5 | 5 |
| SEBS I | 25 | 25 | 25 | 25 |
| Mg(OH)$_2$ | 15 | 15 | 15 | 15 |
| ZB | 0 | 0 | 5 | 5 |
| SIA | 0 | 0 | 0 | 0 |
| Melamine Cyanurate | 10 | 10 | 5 | 5 |
| Additives | 1.15 | 1.15 | 1.15 | 1.15 |
| TOTAL (pbw) | 101.2 | 101.2 | 101.2 | 101.2 |
| Total HBC content (%) | 24.7 | 24.7 | 24.7 | 24.7 |
| Total PO content (%) | 29.6 | 29.6 | 29.6 | 29.6 |
| (Total PO)/PPE | 0.9 | 0.9 | 0.9 | 0.9 |
| (Total PO)/(PPE + FR) | 0.5 | 0.5 | 0.5 | 0.5 |
| PO (%) | 14.8 | 14.8 | 14.8 | 14.8 |
| PO/(PPE + FR) | 0.3 | 0.3 | 0.3 | 0.3 |
| MATERIAL PROPERTIES | | | | |
| MFR, 250° C., 5 kg (g/10 min) | 20.2 | 12.2 | 5.2 | 5.2 |
| Flexural Modulus (MPa) | 131 | 109 | 115 | 105 |
| Modulus of Elasticity (MPa) | 79.8 | 84.8 | 61.2 | 57.4 |
| Shore A Hardness | 94 | 93 | 94 | 94 |
| Tensile Stress (MPa) | 16.7 | 16.6 | 15.5 | 15.7 |
| Tensile Elongation (%) | 84 | 108 | 94 | 109 |
| FOT UL94V, 6.4 mm (sec) | 90.6 | 8.4 | 201.20 | 65.7 |
| WIRE PROPERTIES | | | | |
| FOT, VW-1/1C (sec) | F | F | F | F |
| FOT, VW-1/2C (sec) | 18.7 | F | F | F |
| Tensile Stress (MPa) | 26.8 | 12.2 | 22.2 | 21.0 |

TABLE 9-continued

|  | C. Ex. 30 | Ex. 26 | C. Ex. 31 | Ex. 27 | C. Ex. 32 | Ex. 28 |
|---|---|---|---|---|---|---|
| Tensile Elongation (%) |  | 173 |  | 88 |  |  |
| Heat Deformation, 100° C., 250 g, 1 h (%) |  | 1.8 |  | 9.3 |  |  |
| Tensile Elongation (%) |  |  |  |  | 155 | 161 |
| Heat Deformation, 100° C., 250 g, 1 h (%) |  |  |  |  | 3.0 | 4.1 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (for example, it includes the degree of error associated with measurement of the particular quantity).

The invention claimed is:

1. A composition, comprising:
   5 to 55 weight percent of a poly(arylene ether)-polysiloxane block copolymer reaction product comprising
      a poly(arylene ether) homopolymer, and
      a poly(arylene ether)-polysiloxane block copolymer comprising
         a poly(arylene ether) block, and
         a polysiloxane block comprising, on average, 35 to 80 siloxane repeating units;
      wherein the poly(arylene ether)-polysiloxane block copolymer reaction product comprises 1 to 8 weight percent siloxane repeating units and 92 to 99 weight percent arylene ether repeating units;
      wherein the poly(arylene ether)-polysiloxane block copolymer reaction product is the product of a process comprising oxidatively copolymerizing a monomer mixture comprising a monohydric phenol and a hydroxyaryl-terminated polysiloxane; and
      wherein the poly(arylene ether)-polysiloxane block copolymer reaction product has a weight average molecular weight of at least 30,000 atomic mass units;
   10 to 55 weight percent of a hydrogenated block copolymer of an alkenyl aromatic compound and a conjugated diene; and
   2 to 25 weight percent of a flame retardant;
   wherein all weight percents are based on the total weight of the composition.

2. The composition of claim 1, wherein the poly(arylene ether)-polysiloxane block copolymer reaction product has a weight average molecular weight of 30,000 to 150,000 atomic mass units.

3. The composition of claim 1, wherein the poly(arylene ether)-polysiloxane block copolymer reaction product has an intrinsic viscosity of 0.3 to 0.6 deciliter per gram as measured at 25° C. in chloroform.

4. The composition of claim 1, wherein the poly(arylene ether)-polysiloxane block copolymer reaction product comprises less than 25 weight percent of molecules having a molecular weight less than 10,000 atomic mass units.

5. The composition of claim 4, wherein the molecules having a molecular weight less than 10,000 atomic mass units comprise, on average, 5 to 10 weight percent siloxane repeating units.

6. The composition of claim 1, wherein the poly(arylene ether)-polysiloxane block copolymer reaction product comprises less than 25 weight percent of molecules having a molecular weight greater than 100,000 atomic mass units.

7. The composition of claim 6, wherein the molecules having a molecular weight greater than 100,000 atomic mass units comprise, on average, 3 to 6 weight percent siloxane repeating units.

8. The composition of claim 1, wherein the monohydric phenol consists of 2,6-dimethylphenol, and wherein the poly(arylene ether)-polysiloxane block copolymer reaction product comprises less than or equal to 0.4 weight percent of 2,6-dimethylphenoxy groups.

9. The composition of claim 1, wherein the monohydric phenol consists of 2,6-dimethylphenol, and wherein the poly(arylene ether)-polysiloxane block copolymer reaction product comprises less than or equal to 1 weight percent of 2,6-dimethylphenoxy groups.

10. The composition of claim 1,
   wherein the poly(arylene ether) block comprises arylene ether repeating units having the structure

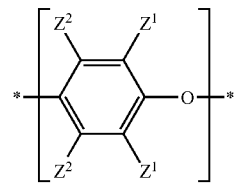

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom;

wherein the polysiloxane block comprises repeating units having the structure

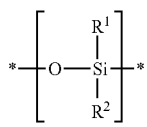

wherein each occurrence of $R^1$ and $R^2$ is independently hydrogen, $C_1$-$C_{12}$ hydrocarbyl or $C_1$-$C_{12}$ halohydrocarbyl; and wherein the polysiloxane block further comprises a terminal unit having the structure

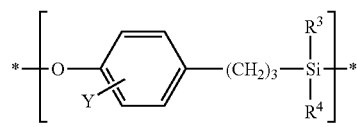

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halo hydrocarbyl.

11. The composition of claim 1,
wherein the poly(arylene ether) block comprises arylene ether repeating units having the structure

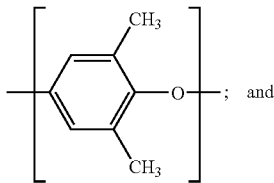

and wherein the polysiloxane block has the structure

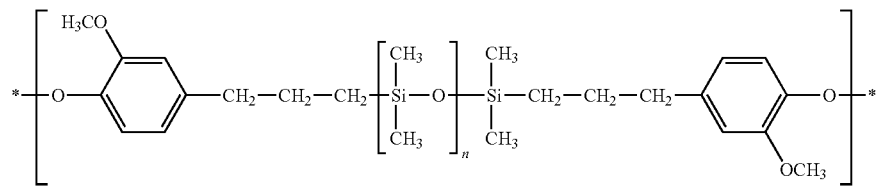

wherein n is 35 to 60; and
wherein the poly(arylene ether)-polysiloxane block copolymer reaction product has a number average molecular weight of 10,000 to 30,000 atomic mass units.

12. The composition of claim 1, comprising less than or equal to 55 weight percent total polyolefin based on the total weight of the composition, wherein total polyolefin consists of polyolefins, polyolefin blocks in block copolymers, and polyolefin backbones and grafts in graft copolymers.

13. The composition of claim 1, wherein a weight ratio of total polyolefin to poly(arylene ether)-polysiloxane block copolymer reaction product is less than or equal to 1.5:1; wherein total polyolefin consists of polyolefins, polyolefin blocks in block copolymers, and polyolefin backbones and grafts in graft copolymers.

14. The composition of claim 1, wherein a weight ratio of total polyolefin to the sum of flame retardant and poly(arylene ether)-polysiloxane block copolymer reaction product is less than or equal to 1.2:1; wherein total polyolefin consists of polyolefins, polyolefin blocks in block copolymers, and polyolefin backbones and grafts in graft copolymers.

15. The composition of claim 1, wherein a weight ratio of polyolefin to the sum of flame retardant and poly(arylene ether)-polysiloxane block copolymer reaction product is less than or equal to 1:1; wherein polyolefin consists of olefin homopolymers and copolymers.

16. The composition of claim 1, wherein the hydrogenated block copolymer comprises a polystyrene-poly(ethylene-butylene-styrene)-polystyrene triblock copolymer.

17. The composition of claim 1, wherein the hydrogenated block copolymer comprises a polystyrene-poly(ethylene-butylene-styrene)-polystyrene triblock copolymer and a polystyrene-poly(ethylene-butylene)-polystyrene triblock copolymer.

18. The composition of claim 1, wherein the flame retardant is selected from group consisting of metal dialkylphosphinates, triaryl phosphates, metal hydroxides, metal borates, melamine salts, and mixtures thereof.

19. The composition of claim 1, wherein the flame retardant comprises a metal dialkylphosphinate.

20. The composition of claim 1, wherein the flame retardant comprises a triaryl phosphate.

21. The composition of claim 1, wherein the flame retardant comprises a metal dialkylphosphinate and a triaryl phosphate.

22. The composition of claim 1, further comprising 1 to 50 weight percent of a polyolefin.

23. The composition of claim 1,
wherein the composition comprises 25 to 42 weight percent of the poly(arylene ether)-polysiloxane block copolymer reaction product;
wherein the poly(arylene ether) block comprises arylene ether repeating units having the structure

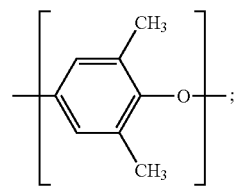

wherein the polysiloxane block has the structure

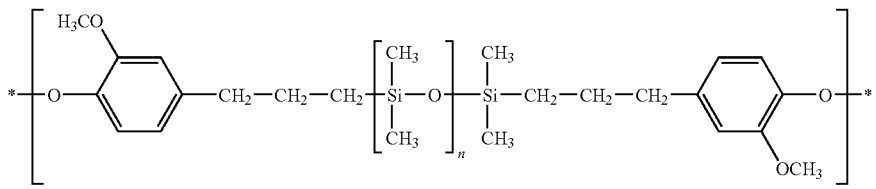

wherein n is 35 to 60;
wherein the poly(arylene ether)-polysiloxane block copolymer reaction product has a number average molecular weight of 10,000 to 30,000 atomic mass units;
wherein the composition comprises 20 to 45 weight percent of the hydrogenated block copolymer;
wherein the hydrogenated block copolymer comprises a polystyrene-poly(ethylene-butylene-styrene)-polystyrene triblock copolymer and a polystyrene-poly(ethylene-butylene)-polystyrene triblock copolymer;
wherein the composition comprises 6 to 16 weight percent of the flame retardant;
wherein the flame retardant comprises a triaryl phosphate;
wherein the composition comprises 25 to 45 weight percent total polyolefin;
wherein total polyolefin consists of polyolefins, polyolefin blocks in block copolymers, and polyolefin backbones and grafts in graft copolymers;
wherein a ratio of total polyolefin to the sum of flame retardant and poly(arylene ether)-polysiloxane block copolymer reaction product is 0.6:1 to 0.9:1.

24. The composition of claim 23, further comprising 3 to 15 weight percent of polybutene.

25. The composition of claim 23, further comprising 3 to 15 weight percent of polypropylene.

26. An extruded or injection molded article, comprising the product of extrusion molding or injection molding a composition comprising:
5 to 55 weight percent of a poly(arylene ether)-polysiloxane block copolymer reaction product comprising
a poly(arylene ether) homopolymer, and
a poly(arylene ether)-polysiloxane block copolymer comprising
a poly(arylene ether) block, and
a polysiloxane block comprising, on average, 35 to 80 siloxane repeating units;
wherein the poly(arylene ether)-polysiloxane block copolymer reaction product comprises 1 to 8 weight percent siloxane repeating units and 92 to 99 weight percent arylene ether repeating units;
wherein the poly(arylene ether)-polysiloxane block copolymer reaction product is the product of a process comprising oxidatively copolymerizing a monomer mixture comprising a monohydric phenol and a hydroxyaryl-terminated polysiloxane; and
wherein the poly(arylene ether)-polysiloxane block copolymer reaction product has a weight average molecular weight of at least 30,000 atomic mass units;
10 to 50 weight percent of a hydrogenated block copolymer of an alkenyl aromatic compound and a conjugated diene; and
2 to 20 weight percent of a flame retardant;
wherein all weight percents are based on the total weight of the composition.

27. The extruded article of claim 26, wherein the extruded or injection molded article is a coated wire comprising
a conductor, and
a covering disposed on the conductor;
wherein the covering comprises the composition.

* * * * *